US012395440B2

(12) United States Patent
Zacharias et al.

(10) Patent No.: US 12,395,440 B2
(45) Date of Patent: Aug. 19, 2025

(54) MODEM THROUGHPUT THROTTLING

(71) Applicant: Qualcomm Incorporated, San Diego, CA (US)

(72) Inventors: Leena Zacharias, San Jose, CA (US); Arnaud Meylan, San Diego, CA (US); Roland Rick, Winter Park, CO (US); Ping Zhou, San Diego, CA (US); Wenshu Zhang, San Diego, CA (US); Hobin Kim, San Diego, CA (US); Jean-Marie Quoc Danh Tran, San Diego, CA (US); Narasimhan Agaram, Hyderabad (IN); Jittra Jootar, La Jolla, CA (US); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/768,260

(22) PCT Filed: Oct. 29, 2020

(86) PCT No.: PCT/US2020/057858
§ 371 (c)(1),
(2) Date: Apr. 12, 2022

(87) PCT Pub. No.: WO2021/087042
PCT Pub. Date: May 6, 2021

(65) Prior Publication Data
US 2024/0323126 A1  Sep. 26, 2024

(30) Foreign Application Priority Data

Oct. 30, 2019  (IN) .............................. 201941043921

(51) Int. Cl.
*H04L 47/10* (2022.01)
*H04W 28/06* (2009.01)
*H04W 28/10* (2009.01)

(52) U.S. Cl.
CPC ............. *H04L 47/23* (2013.01); *H04W 28/06* (2013.01); *H04W 28/10* (2013.01)

(58) Field of Classification Search
CPC ........ H04L 47/23; H04W 28/06; H04W 28/10
See application file for complete search history.

(56) References Cited

U.S. PATENT DOCUMENTS 10,206,134 B1  2/2019  Kocagoez
2008/0101378 A1*  5/2008  Krueger ................. H04L 47/11
370/395.52

(Continued)

OTHER PUBLICATIONS

International Search Report and Written Opinion—PCT/US2020/057858—ISA/EPO—Jan. 25, 2021.

*Primary Examiner* — Melanie Jagannathan
(74) *Attorney, Agent, or Firm* — Dalei Dong; Holland & Hart LLP

(57) ABSTRACT

Methods, systems, and devices for wireless communications are described. A user equipment (UE) may identify a throttling indicator for a shared resource associated with a modem at the UE. The CE may determine a configuration of the modem based on a configuration received from a Radio Resource Control layer of the UE. Based on the modem configuration and the throttling indicator, the UE may identify a throttling level to apply to the modem. The UE may adjust the modem configuration for communicating with a base station based on the throttling level in order to reduce resource usage below a usage threshold. By reducing usage of the shared resource by the modem, the UE may have a greater availability of the shared resource to meet the needs (Continued)

of other components of the UE. This may provide an improved user experience at the UE, among other benefits.

27 Claims, 13 Drawing Sheets

(56) References Cited

U.S. PATENT DOCUMENTS

| | | | |
|---|---|---|---|
| 2011/0013621 A1* | 1/2011 | Krueger | H04L 47/11 370/352 |
| 2012/0250646 A1 | 10/2012 | Rubin et al. | |
| 2012/0297127 A1 | 11/2012 | Belluomini et al. | |
| 2013/0012161 A1* | 1/2013 | Rubin | H04L 47/29 455/406 |
| 2013/0100803 A1* | 4/2013 | Menchaca | H04L 47/17 370/230 |
| 2014/0192646 A1* | 7/2014 | Mir | H04L 47/2441 370/235 |
| 2015/0067815 A1* | 3/2015 | Overcash | G06F 1/3278 726/11 |
| 2015/0201350 A1* | 7/2015 | Perelman | H04L 47/193 370/230 |
| 2015/0245250 A1* | 8/2015 | Bhattacharjee | H04L 5/001 370/236 |
| 2015/0378424 A1 | 12/2015 | Anyuru | |
| 2016/0239057 A1* | 8/2016 | Kocagoez | G06F 11/3024 |
| 2016/0373588 A1* | 12/2016 | Raleigh | H04L 12/1407 |
| 2017/0055007 A1* | 2/2017 | Phillips | H04N 21/2393 |
| 2017/0099204 A1 | 4/2017 | Park et al. | |
| 2018/0227902 A1 | 8/2018 | Gholmieh et al. | |
| 2019/0053097 A1 | 2/2019 | Rico Alvarino et al. | |
| 2019/0103928 A1 | 4/2019 | Nagaraja et al. | |
| 2019/0288877 A1* | 9/2019 | Babbellapati | H04L 41/16 |
| 2020/0022005 A1* | 1/2020 | Campos | H04W 40/22 |
| 2020/0187089 A1* | 6/2020 | Meredith | H04W 48/06 |
| 2020/0267753 A1* | 8/2020 | Adjakple | H04W 72/23 |
| 2020/0351746 A1* | 11/2020 | Jia | H04W 72/51 |
| 2021/0067414 A1* | 3/2021 | Costa | H04N 21/6118 |
| 2021/0243309 A1* | 8/2021 | Stepnioski | H04L 12/14 |
| 2022/0191737 A1* | 6/2022 | Mindler | H04W 28/06 |
| 2023/0046839 A1* | 2/2023 | Raleigh | H04M 15/61 |

* cited by examiner

MODEM THROUGHPUT THROTTLING

CROSS REFERENCE TO RELATED APPLICATIONS

The present Application is a 371 national stage filing of International PCT Application No. PCT/US2020/057858 by Zacharias et al., entitled "MODEM THROUGHPUT THROTTLING," filed Oct. 29, 2020; claims priority to India Provisional Patent Application No. 201941043921 by Zacharias et al., entitled "MODEM THROUGHPUT THROTTLING," filed Oct. 30, 2019, which is assigned to the assignee hereof, and which is expressly incorporated by reference in its entirety herein.

FIELD OF DISCLOSURE

The following relates generally to wireless communications and more specifically to modem throughput throttling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station via a modem component while other components of the UE are in concurrent use. However, for some use cases, conventional modem control techniques may be deficient.

SUMMARY

The described techniques relate to improved methods, systems, devices, and apparatuses that support modem throughput throttling. Generally, the described techniques provide for reducing shared resource usage at a modem of a user equipment (UE) by throttling modem throughput. The UE may identify a throttling indicator for a shared resource associated with a modem at the UE. In some examples, the throttling indicator may indicate to the modem a usage threshold for the shared resource (e.g., a memory bandwidth cap). The UE may determine a configuration of the modem (e.g., a carrier aggregation (CA) configuration, a quantity of component carriers (CCs), a downlink/uplink throughput, etc.). The modem configuration may be based on a configuration received from a Radio Resource Control (RRC) layer of the UE. In some examples, the UE may identify a usage requirement for the shared resource associated with the configuration of the modem. The usage requirement may represent a peak usage based on the configuration of the modem. Based on the modem configuration and the throttling indicator, the UE may identify a throttling level to apply to the modem. In some examples, the UE may adjust the modem configuration for communicating with a base station based on the throttling level in order to reduce the resource usage below the usage threshold. By reducing usage of the shared resource by the modem, the UE may have a greater availability of the shared resource to meet the needs of other components of the UE. This may provide an improved user experience at the UE, among other benefits.

A method for wireless communications at a UE is described. The method may include receiving a throttling indicator and one or more configuration parameters associated with a modem of the UE, the received throttling indicator corresponding to a shared resource of the UE and communicating with a base station based on a throttling level for the modem, where the throttling level indicates a usage threshold associated with the shared resource based on the received throttling indicator and the received configuration parameters.

An apparatus for wireless communications at a UE is described. The apparatus may include means for receiving a throttling indicator and one or more configuration parameters associated with a modem of the UE, the received throttling indicator corresponding to a shared resource of the UE and means for communicating with a base station based on a throttling level for the modem, where the throttling level indicates a usage threshold associated with the shared resource based on the received throttling indicator and the received configuration parameters.

Another apparatus for wireless communications at a UE is described. The apparatus may include a processor, memory in electronic communication with the processor, and instructions stored in the memory. The instructions may be executable by the processor to cause the apparatus to receive a throttling indicator and one or more configuration parameters associated with a modem of the UE, the received throttling indicator corresponding to a shared resource of the UE and communicate with a base station based on a throttling level for the modem, where the throttling level indicates a usage threshold associated with the shared resource based on the received throttling indicator and the received configuration parameters.

A non-transitory computer-readable medium storing code for wireless communications at a UE is described. The code may include instructions executable by a processor to receive a throttling indicator and one or more configuration parameters associated with a modem of the UE, the received throttling indicator corresponding to a shared resource of the UE and communicate with a base station based on a throttling level for the modem, where the throttling level indicates a usage threshold associated with the shared resource based on the received throttling indicator and the received configuration parameters.

Some examples of the method, apparatuses, and non-transitory computer-readable medium described herein may further include operations, features, means, or instructions for determining the usage threshold based on the received throttling indicator.

Some examples of the method, apparatuses, and non-transitory computer-readable medium described herein may further include operations, features, means, or instructions for adjusting a traffic flow at the modem based on the throttling level, where communicating with the base station may be further based on the adjusted traffic flow.

In some examples of the method, apparatuses, and non-transitory computer-readable medium described herein, adjusting the traffic flow may include operations, features, means, or instructions for dropping one or more transmission control protocol packets.

Some examples of the method, apparatuses, and non-transitory computer-readable medium described herein may further include operations, features, means, or instructions for selecting one or more throughput parameters from a look up table based on the received throttling indicator and the received configuration parameters.

Some examples of the method, apparatuses, and non-transitory computer-readable medium described herein may further include operations, features, means, or instructions for determining a usage requirement associated with the shared resource based on the configuration parameters of the modem and comparing the usage requirement with the usage threshold.

Some examples of the method, apparatuses, and non-transitory computer-readable medium described herein may further include operations, features, means, or instructions for determining the usage requirement exceeds the usage threshold based on the comparing and adjusting the configuration parameters to reduce the usage requirement based on the throttling level.

Some examples of the method, apparatuses, and non-transitory computer-readable medium described herein may further include operations, features, means, or instructions for determining the usage threshold exceeds the usage requirement based on the comparing and refraining from adjusting the configuration parameters based on the throttling level.

Some examples of the method, apparatuses, and non-transitory computer-readable medium described herein may further include operations, features, means, or instructions for determining a first resource usage corresponding to a first radio access technology based on the throttling level.

Some examples of the method, apparatuses, and non-transitory computer-readable medium described herein may further include operations, features, means, or instructions for communicating with the base station using the first radio access technology based on the determined first resource usage.

Some examples of the method, apparatuses, and non-transitory computer-readable medium described herein may further include operations, features, means, or instructions for determining a second resource usage corresponding to a second radio access technology based on the throttling level and communicating with the base station using the first radio access technology or the second radio access technology based on the determined first resource usage, the determined second resource usage, or a combination thereof.

Some examples of the method, apparatuses, and non-transitory computer-readable medium described herein may further include operations, features, means, or instructions for identifying a first cell group of the first radio access technology, where the determined first resource usage corresponds to the first cell group, determining a second resource usage corresponding to a second cell group of the first radio access technology based on the throttling level, and communicating with the base station using the first cell group or the second cell group of the first radio access technology based on the determined first resource usage, the determined second resource usage, or a combination thereof.

In some examples of the method, apparatuses, and non-transitory computer-readable medium described herein, communicating with the base station may include operations, features, means, or instructions for transmitting a message to the base station including a negative acknowledgment (NACK), a channel quality indicator (CQI) report, a rank report, or a combination thereof.

In some examples of the method, apparatuses, and non-transitory computer-readable medium described herein, the configuration parameters of the modem include one or more component carriers, one or more layers, a bandwidth, a throughput, or a combination thereof.

Some examples of the method, apparatuses, and non-transitory computer-readable medium described herein may further include operations, features, means, or instructions for determining a change associated with at least one configuration parameter of the configuration parameters, receiving, based on the change, a second throttling level for the modem, and communicating with the base station based on the received second throttling level.

Some examples of the method, apparatuses, and non-transitory computer-readable medium described herein may further include operations, features, means, or instructions for identifying one or more component carriers associated with the modem and a respective throughput corresponding to each component carrier of the component carriers, where the configuration parameters of the modem include the component carriers and the respective throughputs, determining an order of the component carriers based on the respective throughputs, selecting at least one component carrier based on the determined order of the component carriers, and communicating with the base station based on the selected component carrier.

Some examples of the method, apparatuses, and non-transitory computer-readable medium described herein may further include operations, features, means, or instructions for adjusting a mode of operation associated with a component of the UE based on the throttling level. In some examples of the method, apparatuses, and non-transitory computer-readable medium described herein, the component includes an application processor.

In some examples of the method, apparatuses, and non-transitory computer-readable medium described herein, the shared resource includes a memory bandwidth. In some examples of the method, apparatuses, and non-transitory computer-readable medium described herein, the received throttling indicator indicates a memory bandwidth cap for the modem. In some examples of the method, apparatuses, and non-transitory computer-readable medium described herein, the throttling level corresponds to a memory bandwidth back off for the modem. In some examples of the method, apparatuses, and non-transitory computer-readable medium described herein, the memory bandwidth may be associated with double data rate (DDR) synchronous dynamic random-access memory (DRAM).

In some examples of the method, apparatuses, and non-transitory computer-readable medium described herein, the received throttling indicator may be based on a concurrent usage of the shared resource, the concurrent usage associated with a component of the UE. In some examples of the method, apparatuses, and non-transitory computer-readable medium described herein, the component includes an application processor, a camera, a wireless local area network device, or a combination thereof.

DETAILED DESCRIPTION

Figure 1:
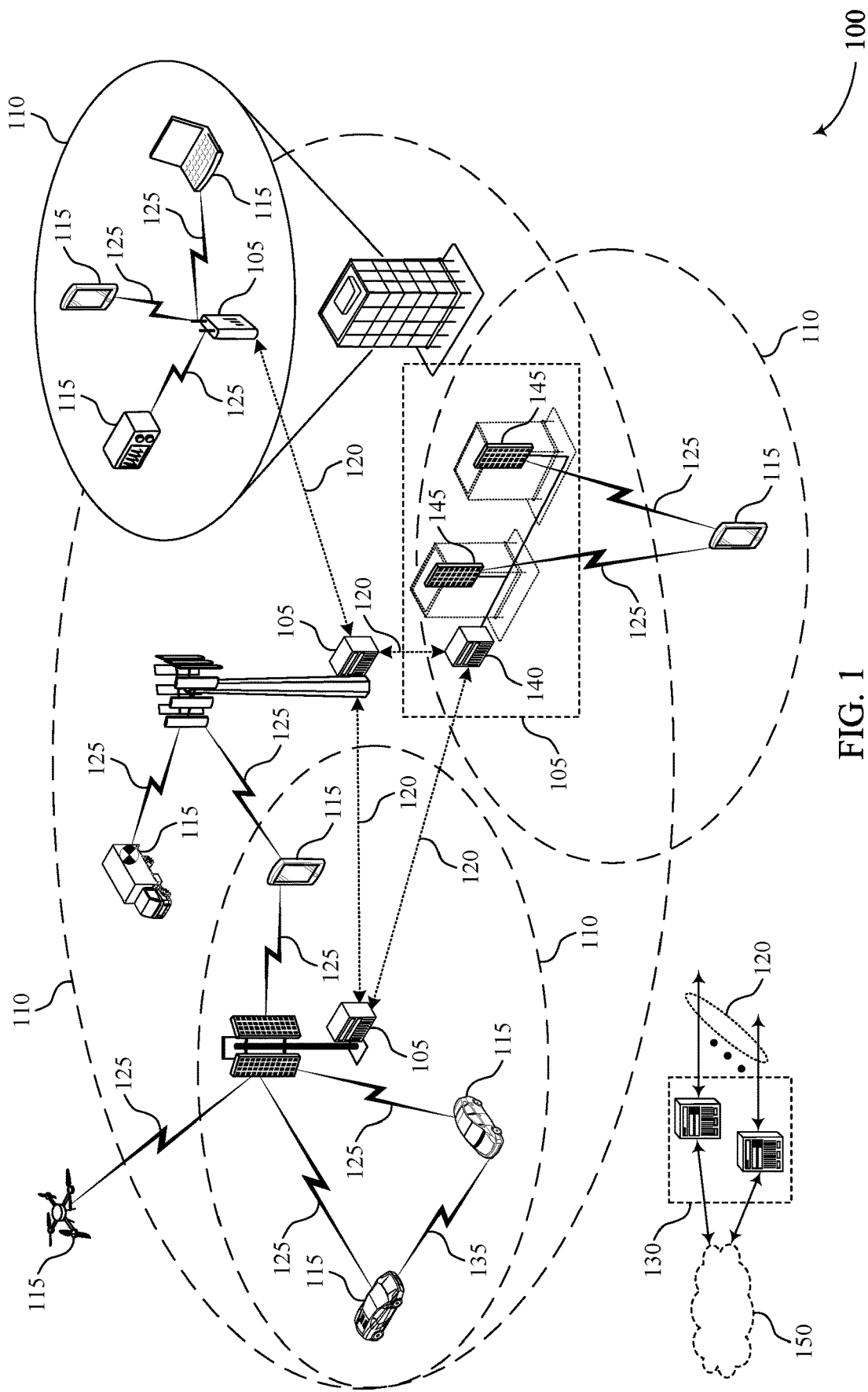
FIGS. 1 and 2 illustrate examples of a wireless communications system that supports modem throughput throttling in accordance with aspects of the present disclosure.

Some wireless communication systems, such as fifth generation (5G) systems which may be referred to as New Radio (NR) systems or Long Term Evolution (LTE) systems, may include user equipment (UE) communicating with network nodes such as base stations. A base station may transmit a packet to a UE in a downlink transmission, and the UE may transmit a packet to the base station in an uplink transmission. The UE may receive and transmit packets using a component such as a modem. Processing packets at the modem, either after receiving a downlink packet for before transmitting an uplink packet, may use resources of the UE. Some resources, such as memory bandwidth or processing power, may be shared among multiple components of the UE (e.g., the modem, an application processor, a camera, a wireless local area network (WLAN) device, etc.).

In some examples, available shared resources may not support concurrent usage of all components of a UE. For example, memory bandwidth may be limited based on a memory component (e.g., a double data rate (DDR) synchronous dynamic random-access memory (DRAM) device) of the UE. With limited shared resources, resource usage at the modem may impact available resources to other components, which may be more visible to a user of the UE in some examples. For example, a user of the UE may wish to use a camera at the UE. The modem may concurrently use a resource shared between the camera and the modem, which may limit the resources available to the camera. The user of the UE may have a degraded experience using the camera due to the resource usage by the modem. It may be beneficial to reduce resource usage at the modem to maintain an expected experience for the user of the UE.

Accordingly, techniques are described herein which may enable a UE to throttle throughput at a modem to reduce shared resource usage. A UE may identify a throttling indicator for a shared resource associated with a modem at the UE. In some examples, the throttling indicator may indicate to the modem a usage threshold for the shared resource (e.g., a memory bandwidth cap). The UE may determine a configuration of the modem (e.g., a carrier aggregation (CA) configuration, a quantity of component carriers (CCs), a downlink/uplink throughput, etc.). The modem configuration may be based on a configuration received from a Radio Resource Control (RRC) layer of the UE. In some examples, the UE may identify a usage requirement for the shared resource associated with the configuration of the modem. The usage requirement may represent a peak usage based on the configuration of the modem. Based on the modem configuration and the throttling indicator, the UE may identify a throttling level to apply to the modem. In some examples, the UE may adjust the modem configuration for communicating with a base station based on the throttling level in order to reduce the resource usage below the usage threshold. By reducing usage of the shared resource by the modem, the UE may have a greater availability of the shared resource to meet the needs of other components of the UE. This may provide an improved user experience at the UE, among other benefits.

The UE may communicate with a wireless network via the modem using one or more radio access technologies (RATs). In some examples, such as in a single connectivity configuration, the UE may apply the usage threshold to communications using a single wireless communications system (e.g., NR or LTE). In some examples, such as in a dual connectivity configuration, the UE may split the usage threshold between two different connectivity schemes. For example, the UE may communicate using an evolved universal mobile telecommunication system terrestrial radio access (E-UTRA)-NR dual connectivity (EN-DC) configuration. The UE may determine a first resource usage for E-UTRA (e.g., LTE) communications and a second resource usage for NR communications, where the first resource usage and the second resource usage are based on the overall usage threshold. In another example, the UE may communicate using two different cell groups in an NR system, which may be referred to as NR-NR dual connectivity (DC). The UE may determine a first resource usage for a first cell group (e.g., a master cell group (MCG)) and a second resource usage for a second cell group (e.g., a secondary cell group (SCG)), where the first resource usage and the second resource usage are based on the overall usage threshold.

In some examples, the UE may identify the throttling level based on a static approach. The UE may be configured with one or more look up tables including throttling actions or configuration adjustments for the modem based on a given usage threshold. The look up tables may include different throttling actions based on DC schemes or the RAT. In some examples, the UE may determine that the peak usage of the modem is below the usage threshold based on the modem configuration, and refrain from further throttling or adjustments. In some examples, the UE may determine the peak usage exceeds the usage threshold, and the UE may limit modem throughput by selecting a throttling level from a lookup table and applying the associated throttling actions or configuration adjustments.

In some examples, the UE may identify the throttling level based on a dynamic approach. In the dynamic approach, the UE may determine a current usage of the modem, which may differ from the peak usage based on the modem configuration. The UE may compare the current usage to the usage threshold, and determine throttling actions based on the comparison. In some examples, the UE may determine that the current usage of the modem is below the usage threshold, and refrain from further throttling or adjustments. In some examples, the UE may determine the current usage exceeds the usage threshold, and determine which throttling actions to take to reduce the current usage below the usage threshold. In some examples, such as in DC schemes, the UE may dynamically determine how to split the usage threshold between two RATs or two cell groups.

Aspects of the disclosure are initially described in the context of wireless communications systems. Examples of a component diagram, a timeline, and a process flow are then discussed. Aspects of the disclosure are further illustrated by and described with reference to apparatus diagrams, system diagrams, and flowcharts that relate to modem throughput throttling.

FIG. 1 illustrates an example of a wireless communications system 100 that supports modem throughput throttling in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an E-UTRA absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz. (MHZ)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz. (MHZ) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communications system 100 may also operate in a super high frequency (SHF) region using frequency bands from 3 GHZ to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may include a number of components such as a modem, an application processor, a camera, a WLAN device, etc. The components of the UE 115 may share one or more resources, such as memory bandwidth or processing power. A shared resource may be limited, and shared resource usage at the modem may impact availability of the shared resource to other components, including components which may be more visible to a user of the UE 115. Accordingly, a UE 115 may determine to throttle modem throughput in order to reduce shared resource usage at the modem to maintain an expected experience for the user of the UE 115.

The UE 115 may identify a throttling indicator associated with the modem for the shared resource. In some examples, the throttling indicator may indicate to the modem a usage threshold for the shared resource (e.g., a memory bandwidth cap). The UE 115 may determine a configuration of the modem (e.g., a CA configuration, a quantity of CCs, a downlink/uplink throughput, etc.). The modem configuration may be based on a configuration received from a RRC layer of the UE 115. In some examples, the UE 115 may identify a usage requirement for the shared resource associated with the configuration of the modem. Based on the modem configuration and the throttling indicator, the UE 115 may identify a throttling level to apply to the modem. In some examples, the UE 115 may adjust the modem configuration for communicating with a base station 105 based on the throttling level in order to reduce the resource usage below the usage threshold. By reducing usage of the shared resource by the modem, the UE 115 may have a greater availability of the shared resource to meet the needs of other components of the UE 115. This may provide an improved user experience at the UE 115, among other benefits.

Figure 2:
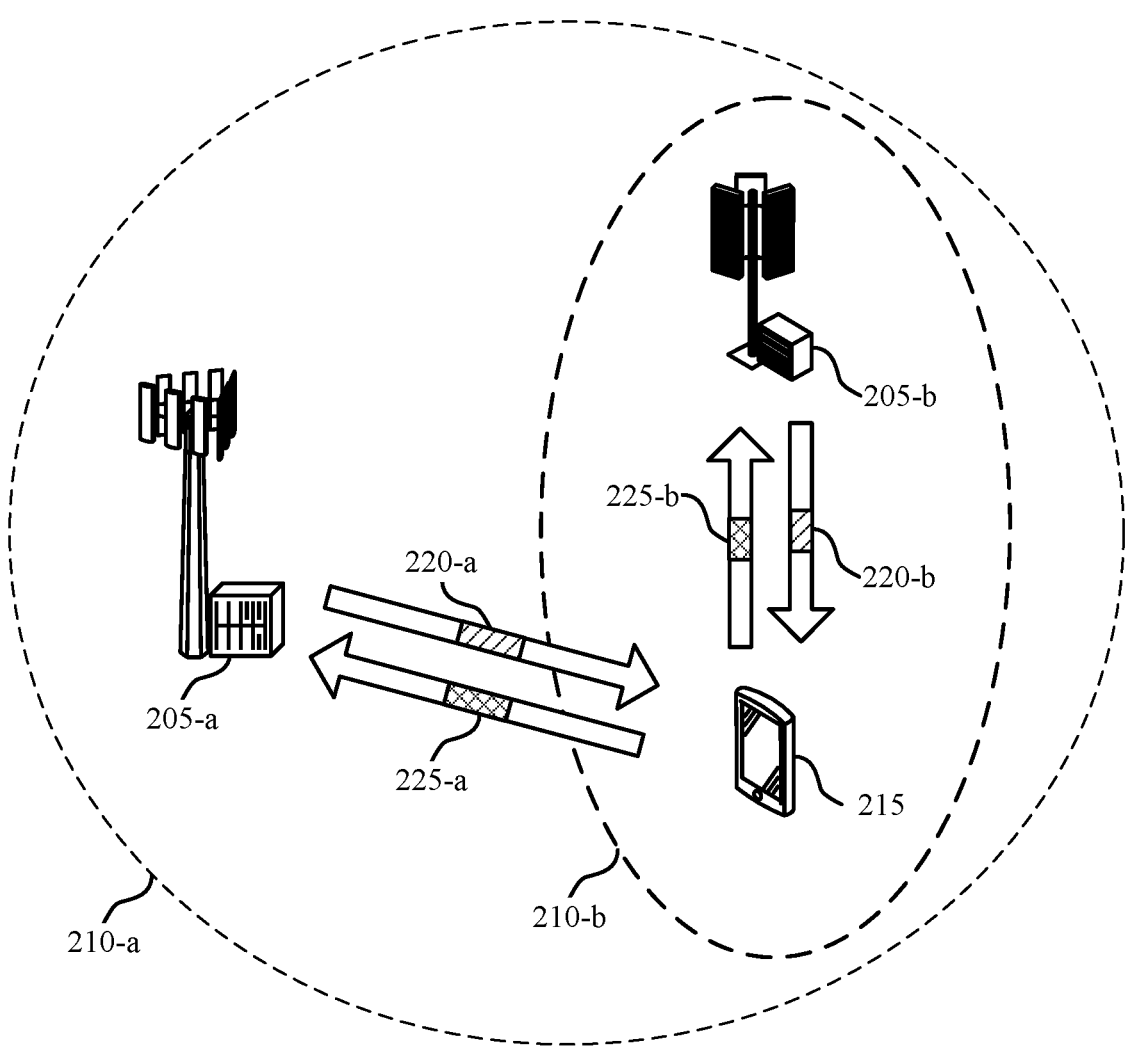

FIG. 2 illustrates an example of a wireless communications system 200 that supports modem throughput throttling in accordance with aspects of the present disclosure. In some examples, the wireless communications system 200 may implement aspects of wireless communication system 100. For example, the wireless communications system 200 may include base stations 205 and a UE 215, which may be examples of the corresponding devices described with reference to FIG. 1. The wireless communications system 200 may include features for improved UE modem throughput throttling operations, among other benefits.

In the wireless communications system 200, the base stations 205 may provide geographic coverage areas 210. The base stations 205 may configure and transmit downlink transmissions 220 to the UE 215, and receive uplink transmissions 225 from the UE 215. The UE 215 may receive and process the downlink transmissions 220, and process and transmit the uplink transmissions 225, for example via a modem at the UE 215. Such throughput at the modem may use resources of the UE 215, including resources that may be shared with other components of the UE 215. A shared resource may be limited, and shared resource usage at the modem may impact availability of the shared resource to components which may be more visible to a user of the UE 215. Accordingly, a UE 215 may determine a throttling level for modem throughput in order to reduce shared resource usage at the modem below a usage threshold.

The UE 215 may communicate with the base stations 205 using a dual connectivity scheme. In one example, the base station 205-a may be an eNB in an LTE network, and the base station 205-b may be a gNB in an NR network. Additionally or alternatively, the base station 205-a may be a master node with an associated MCG, and the base station 205-b may be a secondary node with an associated SCG. Additionally or alternatively, the base station 205-a may operate in a radio frequency spectrum band that supports communications using frequencies below 6 GHZ, and the base station 205-b may operate in a radio frequency spectrum band that supports mmW communications.

In such dual connectivity schemes, the UE 215 may determine a first resource usage for communications (e.g., downlink transmissions 220-a and uplink transmissions 225-a) with the base station 205-a. The UE 215 may additionally determine a second resource usage for communications (e.g., downlink transmissions 220-*b* and uplink transmissions 225-*b*) with the base station 205-*b*. The first resource usage and the second resource usage may be determined based on the overall usage threshold for throttling modem throughput.

In some examples, the UE 215 may identify the throttling level using a static approach by selecting the throttling level from a lookup table. In some examples, the lookup table may indicate a back off amount associated with a memory bandwidth. For example, a throttling level T0 from the lookup table may correspond to no throttling at the modem, a throttling level T1 may correspond to a 1 gigabyte per second (GBps) reduction in memory bandwidth available to the modem, a throttling level T2 may correspond to a 2 GBps reduction in available memory bandwidth, and a throttling level T3 may correspond to a 2.5 GBps reduction in available memory bandwidth. The lookup table may additionally indicate the first resource usage and the second resource usage in a DC scheme.

In some examples, the UE 215 may identify the throttling level using a dynamic approach by comparing the usage threshold with a current usage of the shared resource at the modem. The current usage may be based on the downlink transmissions 220 and the uplink transmissions 225 exchanged with the base stations 205. If the current usage does not exceed the usage threshold, the UE 215 may determine to refrain from throttling the modem. If the current usage exceeds the threshold, the UE 215 may determine which throttling actions to perform to reduce the current usage below the usage threshold. The UE 215 may continue to monitor configuration parameters of the modem, and adjust throttling actions accordingly when the configuration parameters or the current usage change.

In some examples, the UE 215 may identify a shared resource usage (e.g., a memory bandwidth usage) at an IP address level of the modem. The resource may be limited based on a burstiness of data arriving in the downlink transmissions 220. For example, an increase or decrease in a frequency of the downlink transmissions 220 based reordering or retransmissions at a radio link layer level of the modem may increase the shared resource usage. Additionally or alternatively, a burstiness of data from an application layer to the modem of the UE 215 may increase the shared resource usage, for example based on a host scheduling or a memory or modem grant management to a host.

Based on the shared resource usage at the IP address level, the UE 215 may selectively drop or control traffic at the modem to reduce the shared resource usage. In some examples, the UE 215 may drop or control traffic on one or more radio bearers, such as a bearer that is not part of a guaranteed bit rate (GBR) requirement for the modem. Additionally or alternatively, the UE 215 may reduce a supported GBR, such as by dropping or controlling traffic on a dedicated radio bearer. In some examples, the UE 215 may drop traffic for one or more end points, which in some examples may be similar to prioritizing tethered traffic or embedded traffic over other traffic. In some examples, the UE 215 may selectively drop a flow level traffic while protecting other flows.

In some examples, the UE 215 may induce a transmission control protocol (TCP) packet drop at the IP address level of the modem to reduce the shared resource usage. For example, a TCP packet drop in a downlink transmission 220 may reduce overall TCP flow characteristics at the modem. Additionally or alternatively, the UE 215 may delay or drop one or more TCP acknowledgment (ACK) transmissions in an uplink transmission 225, which may slow down TCP scheduling and reduce the shared resource usage at the modem. In some examples, a TCP packet drop in an uplink transmission 225 may result in duplicate ACK transmissions in TCP scheduling in the uplink transmissions 225 and the downlink transmissions 220. In some examples, such as in the case of user datagram protocol (UDP), the UE 215 may drop flow associated traffic in the uplink transmissions 225 and the downlink transmissions 220 to slow down an application level of the UE 215, or reconfigure resource usage at the application level to a lower rate (e.g., a rate associated with video encoding). In some examples, the UE 215 may control or throttle a slice behavior to reduce resource usage at the modem. In some examples, the UE may renegotiate a TCP window size for one or more flows with a base station 205. Additionally or alternatively, the UE 215 may transmit a congestion indication to a base station 205.

The wireless communications system 200 may include features for improved UE modem throughput throttling operations, among other benefits. For example, the modem throughput throttling may improve reliability of other components of the UE 215, including components which may be more visible than the modem to a user of the UE. Accordingly, the modem throughput throttling operations described herein may improve a user experience at the UE 215.

Figure 3:
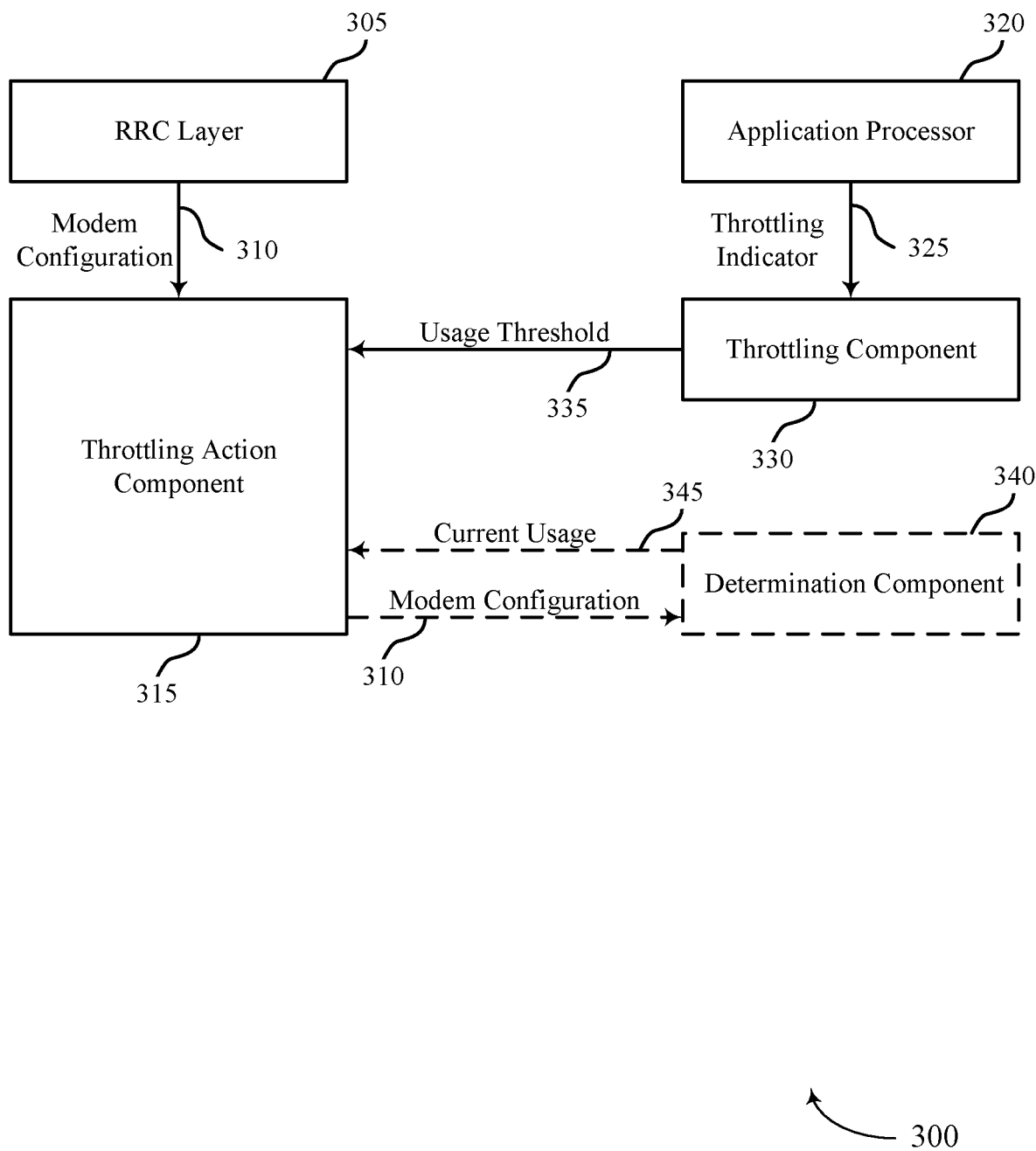
FIG. 3 illustrates an example of a component diagram that supports modem throughput throttling in accordance with aspects of the present disclosure.

FIG. 3 illustrates an example of a component diagram 300 that supports modem throughput throttling in accordance with aspects of the present disclosure. In some examples, the component diagram 300 may implement aspects of wireless communication systems 100 and 200. The component diagram 300 may be associated with operations at a UE, which may be an example of corresponding devices described with reference to FIGS. 1 and 2. The component diagram 300 may include features for improved modem throughput throttling operations and improved UE component reliability, among other benefits.

An RRC layer 305 may provide establishment, configuration, and maintenance of an RRC connection between the UE and a base station or a core network. The RRC layer 305 may determine a modem configuration 310 and provide details of the modem configuration 310 to a throttling action component 315. The modem configuration 310 may include a CA configuration, a quantity of CCs associated with wireless communications, a quantity of MIMO layers, a downlink throughput, an uplink throughput, or additional configuration parameters, or a combination thereof.

An application processor 320 may determine that a component of the UE (e.g., a camera) is to be used concurrently with the modem. The application processor 320 may identify a resource (e.g., a memory bandwidth) that is shared between the component and the modem. The application processor 320 may determine that a shared resource usage at the component has a higher priority than a shared resource usage at the modem, and the application processor 320 may determine modem throughput is to be throttled in order to reduce the shared resource usage at the modem. The application processor may provide a throttling indicator 325 to a throttling component 330, where the throttling indicator 325 may be associated with the identified shared resource.

The throttling component 330 may determine a usage threshold 335 associated with the shared resource for the modem based on the throttling indicator. For example, the usage threshold 335 may correspond to a cap, a restriction, or a back off amount associated with a memory bandwidth. The throttling component 330 may provide the usage threshold 335 to the throttling action component 315.

The throttling action component 315 may determine a throttling level for the modem based on the modem configuration 310 and the usage threshold 335. In some examples, such as in the static approach, the throttling action component 315 may determine the throttling level by selecting the throttling level from a lookup table. The throttling level may be based on peak usage determined from the modem configuration 310. In some examples, such as in the dynamic approach, the throttling action component may provide the modem configuration 310 to a determination component 340. The determination component 340 may determine a current usage 345 of the shared resource at the modem based on the modem configuration 310 and communications between the UE and a base station. The determination component 340 may provide the current usage 345 to the throttling action component 315. The throttling action component 315 may then identify the throttling level based on the modem configuration 310, the usage threshold 335, and the current usage 345.

Based on the identified throttling level, the throttling action component 315 may determine which throttling actions to perform to reduce the shared resource usage at the modem below the usage threshold 335. The shared resource usage at the modem may include resources used for receiving and processing downlink transmissions, processing and transmitting uplink transmissions, or a combination thereof. The throttling actions performed by the throttling action component 315 may include HARQ throttling actions, downlink throughput throttling actions, radio link failure (RLF) reporting, uplink throughput throttling actions, RRC throttling actions, non-access stratum (NAS) throttling actions, or a combination thereof.

In HARQ throttling, the UE may employ HARQ compression techniques for throttling. In HARQ compression, the modem may reduce a bitwidth for log-likelihood ratios (LLRs) associated with decoding downlink transmissions. Additionally or alternatively, the UE may throttle LLRs for onloading or offloading procedures associated with HARQ feedback. HARQ throttling techniques may be throttling actions that may be performed at the UE without additional steps including a base station.

In downlink throughput throttling, the UE may transmit HARQ negative acknowledgment (NACK) transmissions to the base station to reduce downlink throughput at the modem. For example, the UE may have limited available memory bandwidth based on the usage threshold 335, and so the UE may use a longer duration to perform decoding procedures for downlink transmissions based on the limited available memory bandwidth. To reduce throughput of downlink transmissions while performing the decoding procedures, the UE may transmit NACK transmissions (which may be referred to as "fake" HARQ NACK transmissions) to the base station. In response to the NACK transmissions, the base station may transmit repetitions of a downlink transmission rather than transmitting new downlink transmissions for the UE. The UE may discard the repetitions while performing a decoding procedure of the downlink transmissions, which may reduce the effective throughput of downlink transmissions to the UE.

The UE may additionally reduce downlink throughput by reducing the quantity of MIMO layers used for communicating with the base station. The UE may reduce the quantity of layers by reporting a lower rank to the base station in a rank report. Additionally, the UE may transmit a channel quality indicator (CQI) report that indicates one or more layers or CCs are unfavorable for downlink transmissions, which may reduce the quantity and throughput of downlink transmissions to the UE. The UE may transmit rank reports and CQI reports periodically as configured by the base station, and so such throughput throttling techniques may be effective on a timescale corresponding to a periodicity of the rank reports and the CQI reports respectively.

The UE may additionally use RLF reporting (which may in some examples be referred to as virtual RLF (vRLF) reporting) to throttle modem throughput. The UE may report an RLF for a cell (e.g., a secondary cell (SCell)) by reporting a CQI of zero for the cell. The UE may select cells for reporting RLF according to an order based on the downlink or uplink throughput associated with the cells. RLF as a throughput throttling technique may be effective on a timescale corresponding to a reaction time of the network reacting to the CQI report and refraining from scheduling on the corresponding cell.

RRC throttling actions may impact the modem configuration 310 provided by the RRC layer 305. For example, the UE may use techniques to indicate overheating to reduce capabilities in the modem configuration 310. The UE may use overheating reduction techniques to reduce the quantity of MIMO layers or CCs in the modem configuration 310, which may reduce modem throughput. RRC throttling actions may be effective on a timescale corresponding to RRC messaging (e.g., tens of milliseconds (ms)).

NAS throttling actions may include reducing capabilities of the UE using a NAS registration update procedure. For example, the UE may declare a modified capability different from a capability which may correspond to the peak usage, or a usage greater than the usage threshold 335. NAS throttling actions may be effective on a timescale corresponding to NAS messaging (e.g., 100 ms), with an additional delay at the RRC layer 305 for determining the modified capability and providing the associated modem configuration 310.

In some examples, the UE may perform additional throttling actions associated with other components of the UE to reduce the shared resource usage at the modem below the usage threshold 335. For example, the application processor 320 may be configured based on a metric other than the shared resource usage, such as a UE central processing unit (CPU) usage, or another metric, or a combination thereof. Based on the identified throttling level, the UE may determine to adjust a mode of operation of the application processor 320 based on the shared resource usage at the modem. In some examples, such as when the shared resource is memory bandwidth, the UE may adjust the mode of operation of the application processor 320 to reduce a quantity of read and write operations performed by the modem. For example, if a read or write operation is based on a configured procedure of the application processor 320, such as an aggregation of a quantity of packets under a single TCP/IP header (e.g., as part of a generic receive offload (GRO) process), the UE may determine to disable the configured procedure to reduce the shared resource usage at the modem.

Figure 4:
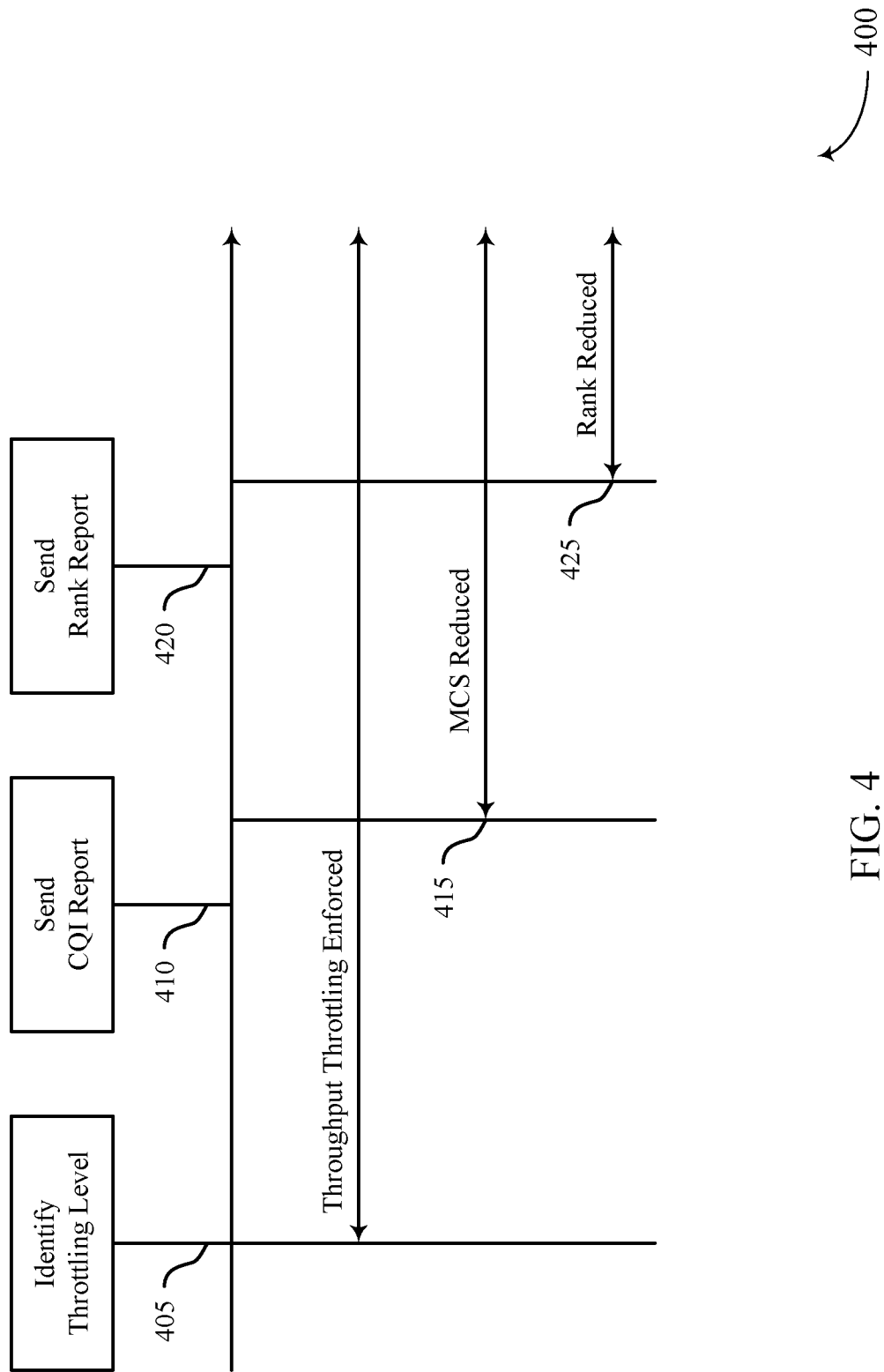
FIG. 4 illustrates an example of a timeline that supports modem throughput throttling in accordance with aspects of the present disclosure.

FIG. 4 illustrates an example of a timeline 400 that supports modem throughput throttling in accordance with aspects of the present disclosure. In some examples, timeline 400 may implement aspects of wireless communication systems 100 and 200. The timeline 400 may be associated with operations at a UE, which may be an example of corresponding devices described with reference to FIGS. 1 and 2. The timeline 400 may be associated with operations for throttling modem throughput based on a dynamic approach as described herein. The timeline 400 may include features for improved modem throughput throttling operations and improved UE component reliability, among other benefits.

At a time 405, the UE may identify a throttling level as described herein. In some examples, the UE may identify the throttling level by selecting the throttling level from a lookup table based on a determined usage threshold. From the time 405, the UE may begin enforcing modem throughput throttling, which may include transmitting NACK transmissions to a base station to reduce a downlink throughput at the modem, as described with reference to FIG. 3.

At a time 410, the UE may transmit a CQI report to the base station that indicates one or more layers or CCs are unfavorable for downlink transmissions. In response, from a time 415, the base station may reduce a modulation and coding scheme (MCS) associated with downlink transmissions to the UE.

At a time 420, the UE may transmit a rank report to the base station. The rank report may report a lower rank to the base station in order to reduce the quantity of MIMO layers used for communications between the base station and the UE. In response, from a time 425, the base station may reduce a rank of one or more CCs, which may further reduce the throughput of downlink transmissions to the UE.

Figure 5:
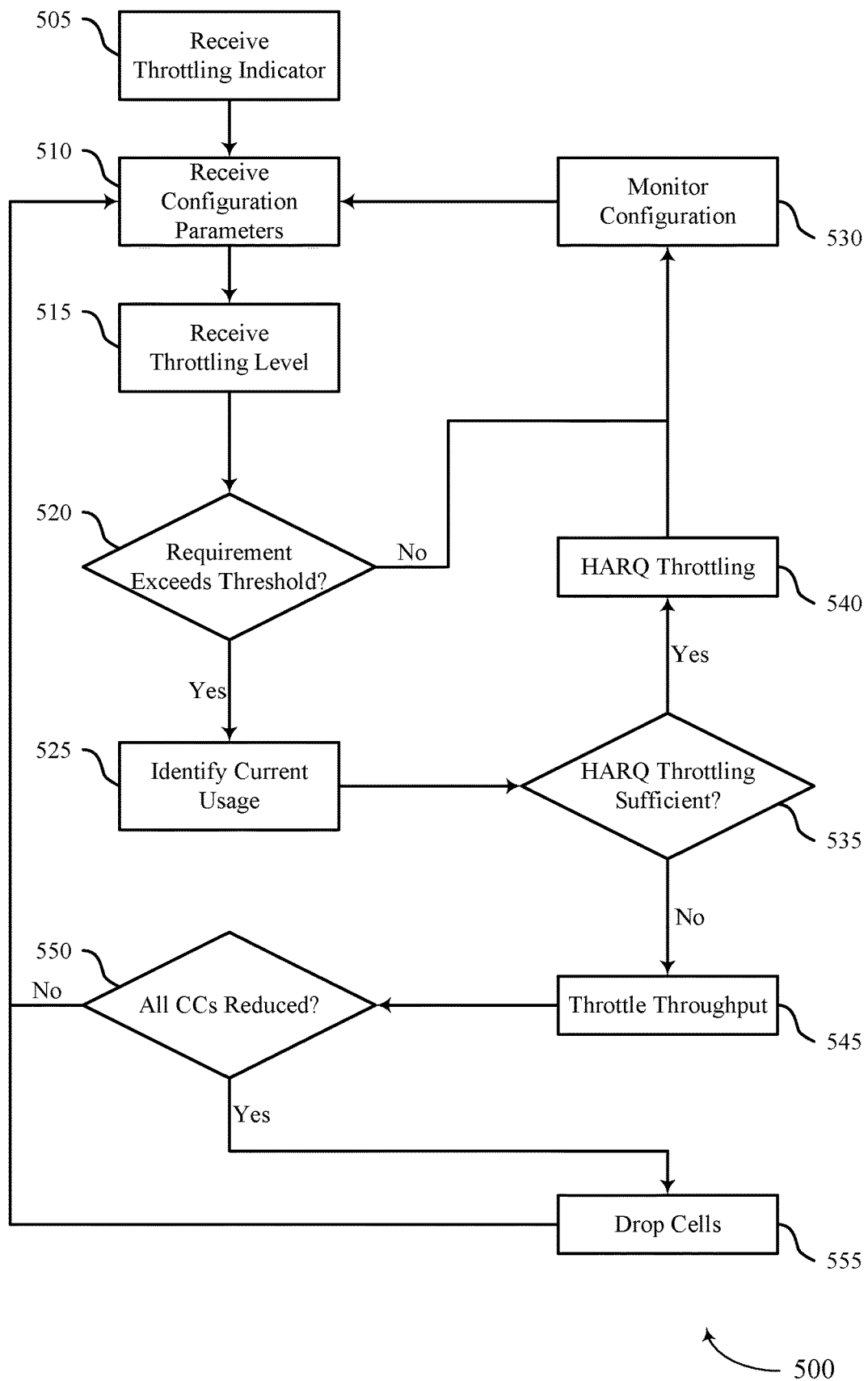
FIG. 5 illustrates an example of a process flow that supports modem throughput throttling in accordance with aspects of the present disclosure.

FIG. 5 illustrates an example of a process flow 500 that supports modem throughput throttling in accordance with aspects of the present disclosure. In some examples, process flow 500 may implement aspects of wireless communication system 100. For example, the process flow 500 may include operations performed by a UE, which may be an example of the corresponding device described with reference to FIGS. 1 and 2. The process flow 500 may include operations for throttling modem throughput based on a dynamic approach as described herein. In the following description of the process flow 500, the operations may be performed in a different order than the example order shown, or the operations may be performed in different orders or at different times. Some operations may also be omitted from the process flow 500, and other operations may be added to the process flow 500. The operations performed by the UE may support improvements to UE resource usage efficiency and, in some examples, may promote improvements to the UE reliability, among other benefits.

At 505, the UE may receive, such as from an application processor, a throttling indicator associated with a modem for a shared resource as described herein. The throttling indicator may indicate to the modem a usage threshold for the shared resource (e.g., a memory bandwidth cap).

At 510, the UE may receive configuration parameters (e.g., a CA configuration, a quantity of CCs, a downlink/uplink throughput, etc.) of the modem, for example based on a message from an RRC protocol layer. In some examples, the UE may identify a usage requirement for the shared resource associated with the configuration parameters of the modem. The usage requirement may represent a peak usage based on the configuration of the modem.

At 515, the UE may receive a throttling level to apply to the modem based on the modem configuration parameters and the throttling indicator. The throttling level may be based on the usage requirement.

At 520, a decision may be made as to whether the usage requirement exceeds the usage threshold indicated by the throttling indicator. The decision at 520 may be based on comparing the usage requirement to the usage threshold. If the UE determines the usage requirement (e.g., the peak usage) does not exceed the usage threshold, the process flow 500 may proceed to 530, where the UE may monitor for changes to the modem configuration parameters. When the UE detects a change, the process flow 500 may return to 510.

If the UE determines the usage requirement does exceed the usage threshold at 520, the process flow 500 may proceed to 525, where the UE may identify a current usage of the shared resource at the modem. The current usage may be based on communications between one or more base stations and the UE, as well as the modem configuration. The current usage may differ from the peak usage determined based solely on the modem configuration.

Based on the current usage, the UE may determine which throttling actions to perform in order to reduce the current usage below the usage threshold. At 535, a decision may be made as to whether HARQ throttling techniques, which may be performed internally at the UE, are sufficient to reduce the current usage below the usage threshold. If the UE determines the HARQ throttling techniques are sufficient, the process flow 500 may proceed to 540, where the UE may perform HARQ throttling actions as described with reference to FIG. 3 in order to throttle modem throughput and reduce the shared resource usage at the modem. Following the HARQ throttling, the process flow 500 may proceed to 530, where the UE may monitor for changes to the modem configuration parameters.

If the UE determines at 535 that HARQ throttling techniques are not sufficient to reduce the current usage below the usage threshold, the process flow 500 may proceed to 545, where the UE may perform HARQ throttling actions as well as additional throughput throttling actions as described with reference to FIG. 3, in order to throttle the modem throughput. The throughput throttling actions may include reducing one or more ranks corresponding to one or more CCs.

At 550), a decision may be made as to whether all CCs used for communications between the UE and the base stations have been reduced, which may include reducing ranks corresponding to each CC. If the UE determines that not all CCs have been reduced, the process flow 500 may proceed to 510, where the UE may again determine the modem configuration parameters, which may have been changed due to the throttling actions performed at 545.

If the UE determines at 550 that all CCs have been reduced, the process flow 500 may proceed to 555, where the UE may drop one or more cells to further throttle modem throughput. Dropping a cell may include reporting an RLF for the cell (e.g., an SCell) by reporting a CQI of zero for the cell as describe with reference to FIG. 3. The UE may select cells for reporting RLF according to an order based on the downlink or uplink throughput associated with the cells. After dropping one or more cells, the process flow 500 may proceed to 510, where the UE may again determine the modem configuration parameters, which may have been changed due to the throttling actions performed at 545 and 555.

The operations performed by the UE in the process flow 500 may support improvements to UE resource usage efficiency and, in some examples, may promote improvements to the UE reliability, among other benefits.

Figure 6:
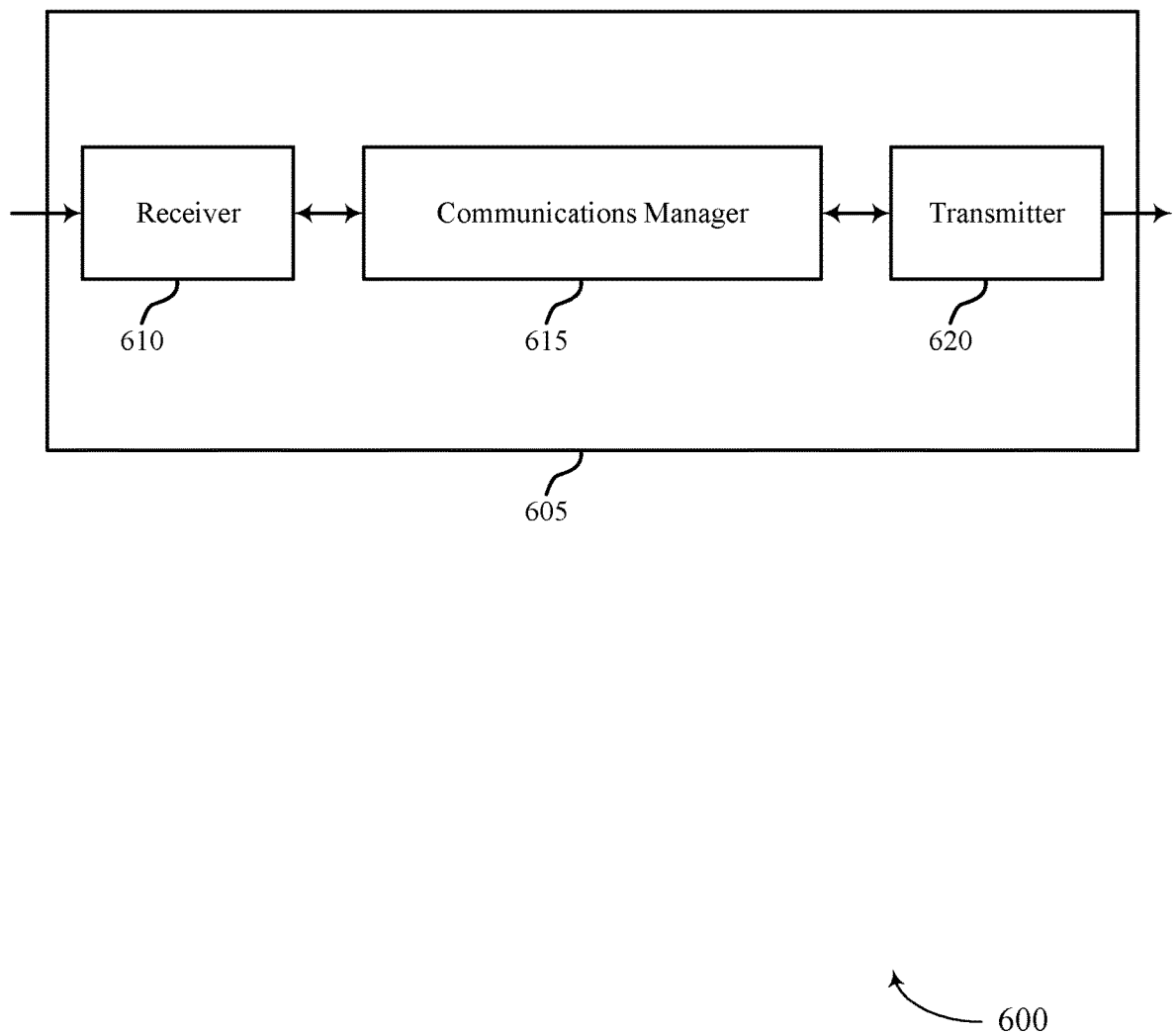
FIGS. 6 and 7 show block diagrams of devices that support modem throughput throttling in accordance with aspects of the present disclosure.

FIG. 6 shows a block diagram 600 of a device 605 that supports modem throughput throttling in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to modem throughput throttling, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a throttling indicator and one or more configuration parameters associated with a modem of the UE, the received throttling indicator corresponding to a shared resource of the UE, and communicate with a base station based on a throttling level for the modem, where the throttling level indicates a usage threshold associated with the shared resource based on the received throttling indicator and the received configuration parameters.

The communications manager 615 as described herein may be implemented to realize one or more potential advantages. One implementation may allow the device 605 to save power and increase battery life by throttling communications with a base station 105 (as shown in FIG. 1). For example, the device 605 may transmit additional NACK transmissions to the base station 105, so the device 605 may be able to process downlink transmissions using the shared resource more efficiently. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
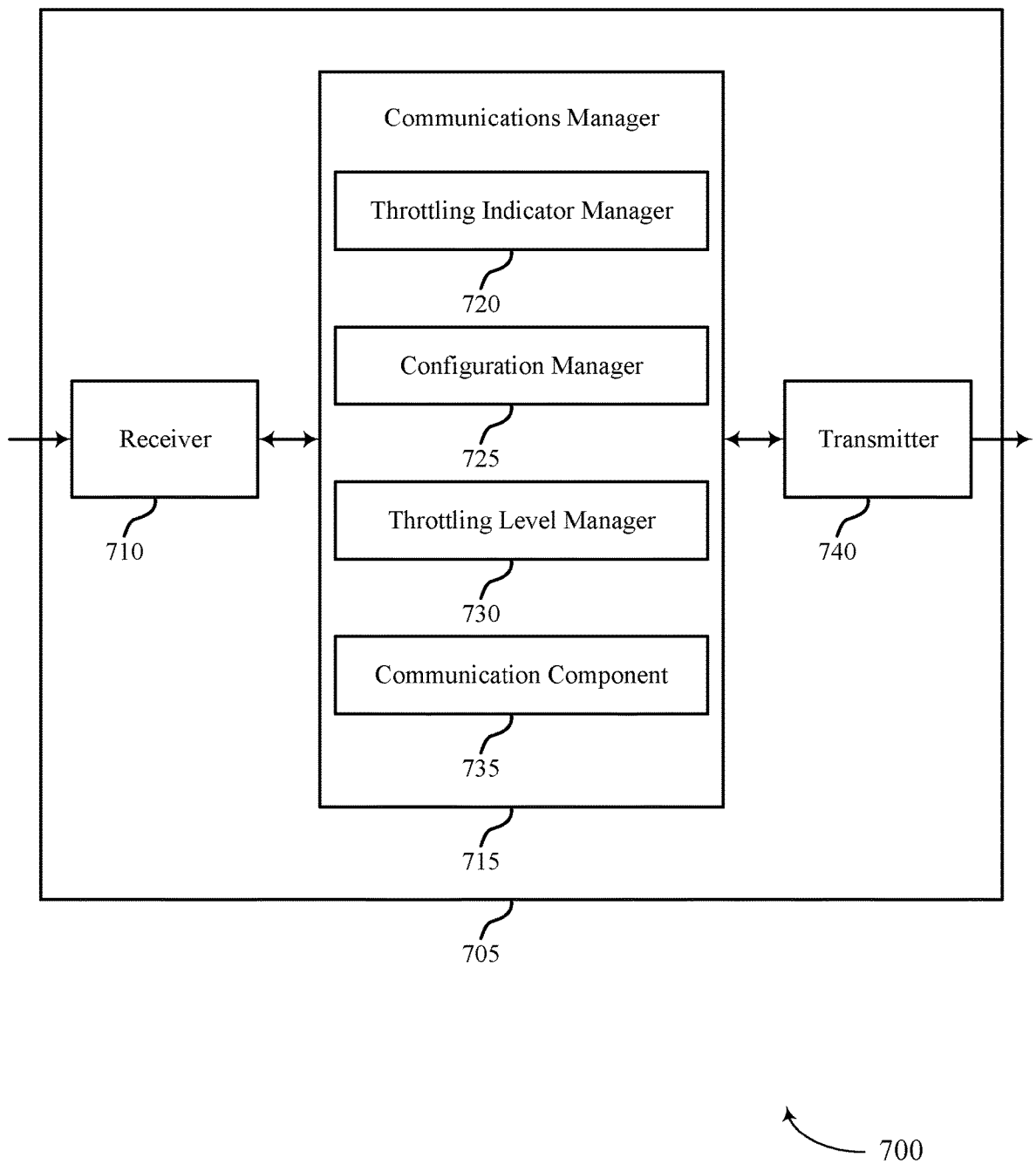

FIG. 7 shows a block diagram 700 of a device 705 that supports modem throughput throttling in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to modem throughput throttling, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a throttling indicator manager 720, a configuration manager 725, a throttling level manager 730, and a communication component 735. The communications manager 715 may be an example of aspects of the communications manager 910 described herein.

The throttling indicator manager 720 and the configuration manager 725 may receive a throttling indicator and one or more configuration parameters associated with a modem of the UE, the received throttling indicator corresponding to a shared resource of the UE.

The throttling level manager 730 and the communication component 735 may communicate with a base station based on a throttling level for the modem, where the throttling level indicates a usage threshold associated with the shared resource based on the received throttling indicator and the received configuration parameters.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
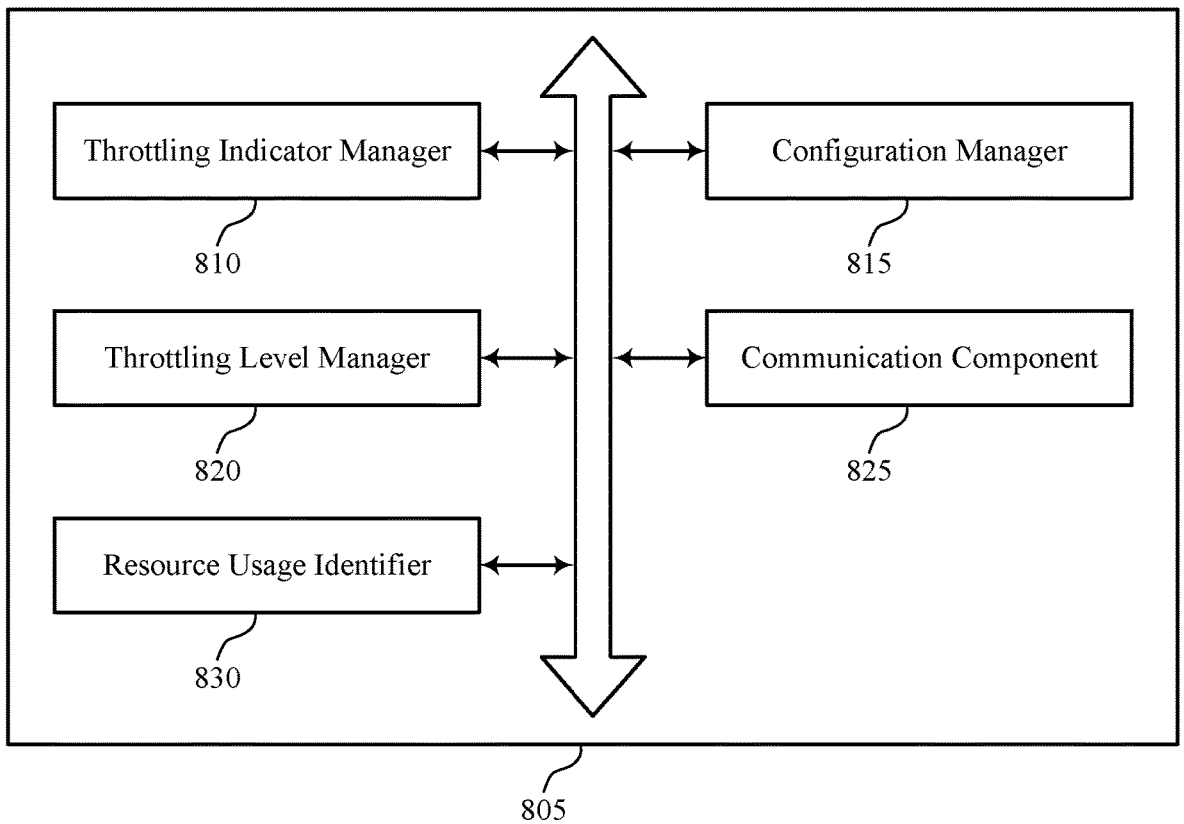
FIG. 8 shows a block diagram of a communications manager that supports modem throughput throttling in accordance with aspects of the present disclosure.

FIG. 8 shows a block diagram 800 of a communications manager 805 that supports modem throughput throttling in accordance with aspects of the present disclosure. The communications manager 805 may be an example of aspects of a communications manager 615, a communications manager 715, or a communications manager 910 described herein. The communications manager 805 may include a throttling indicator manager 810, a configuration manager 815, a throttling level manager 820, a communication component 825, and a resource usage identifier 830. Each of these modules may communicate, directly or indirectly, with one another (e.g., via one or more buses).

The throttling indicator manager 810 and the configuration manager 815 may receive a throttling indicator and one or more configuration parameters associated with a modem of the UE, the received throttling indicator corresponding to a shared resource of the UE.

In some examples, the throttling indicator manager 810 may determine the usage threshold based on the throttling indicator. In some cases, the shared resource includes a memory bandwidth. In some cases, the throttling indicator indicates a memory bandwidth cap for the modem. In some cases, the memory bandwidth is associated with double data rate (DDR) synchronous dynamic random-access memory (DRAM).

In some cases, the throttling indicator is based on a concurrent usage of the shared resource, the concurrent usage associated with a component of the UE. In some cases, the component includes an application processor, a camera, a wireless local area network device, or a combination thereof.

In some examples, the configuration manager 815 may adjust a mode of operation associated with a component of the UE based on the throttling level. In some cases, the component may comprise an application processor. In some examples, the configuration manager 815 may adjust the configuration parameters to reduce the usage requirement based on the throttling level. In some examples, the configuration manager 815 may refrain from adjusting the configuration parameters based on the throttling level. In some examples, the configuration manager 815 may determine a change associated with at least one configuration parameter of the configuration parameters. In some cases, the configuration parameters of the modem include one or more component carriers, one or more layers, a bandwidth, a throughput, or a combination thereof.

In some examples, the configuration manager 815 may identify one or more component carriers associated with the modem and a respective throughput corresponding to each component carrier of the component carriers, where the configuration parameters of the modem include the component carriers and the respective throughputs. In some examples, the configuration manager 815 may determine an order of the component carriers based on the respective throughputs. In some examples, the configuration manager 815 may select at least one component carrier based on the determined order of the component carriers. In some examples, the configuration manager 815 may reduce a rank associated with the at least one component carrier based on the throttling level.

The throttling level manager 820 and the communication component 825 may communicate with a base station based on a throttling level for the modem, where the throttling level indicates a usage threshold associated with the shared resource based on the received throttling indicator and the received configuration parameters. In some examples, the throttling level manager 820 may select one or more throughput parameters from a look up table based on the received throttling indicator and the received configuration parameters. In some examples, the throttling level manager 820 may identify, based on the change, a second throttling level for the modem. In some cases, the throttling level corresponds to a memory bandwidth back off for the modem.

In some examples, the communication component 825 may communicate with the base station using the first radio access technology based on the first resource usage. In some examples, the communication component 825 may communicate with the base station using the first radio access technology or the second radio access technology based on the first resource usage, the second resource usage, or a combination thereof. In some examples, the communication component 825 may communicate with the base station using the first cell group or the second cell group of the first radio access technology based on the first resource usage, the second resource usage, or a combination thereof. In some examples, the communication component 825 may communicate with the base station based on the selected component carrier.

In some examples, the communication component 825 may transmit a message to the base station including a negative acknowledgment (NACK), a channel quality indicator (CQI) report, a rank report, or a combination thereof.

In some examples, the communication component 825 may communicate with the base station based on the second throttling level.

The resource usage identifier 830 may determine a usage requirement associated with the shared resource based on the configuration parameters of the modem. In some examples, the resource usage identifier 830 may compare the usage requirement with the usage threshold. In some examples, the resource usage identifier 830 may determine the usage requirement exceeds the usage threshold based on the comparing. In some examples, the resource usage identifier 830 may determine the usage threshold exceeds the usage requirement based on the comparing.

In some examples, the resource usage identifier 830 may determine a first resource usage corresponding to a first radio access technology based on the throttling level. In some examples, the resource usage identifier 830 may determine a second resource usage corresponding to a second radio access technology based on the throttling level. In some examples, the resource usage identifier 830 may identify a first cell group of the first radio access technology, where the first resource usage corresponds to the first cell group. In some examples, the resource usage identifier 830 may determine a second resource usage corresponding to a second cell group of the first radio access technology based on the throttling level.

Figure 9:
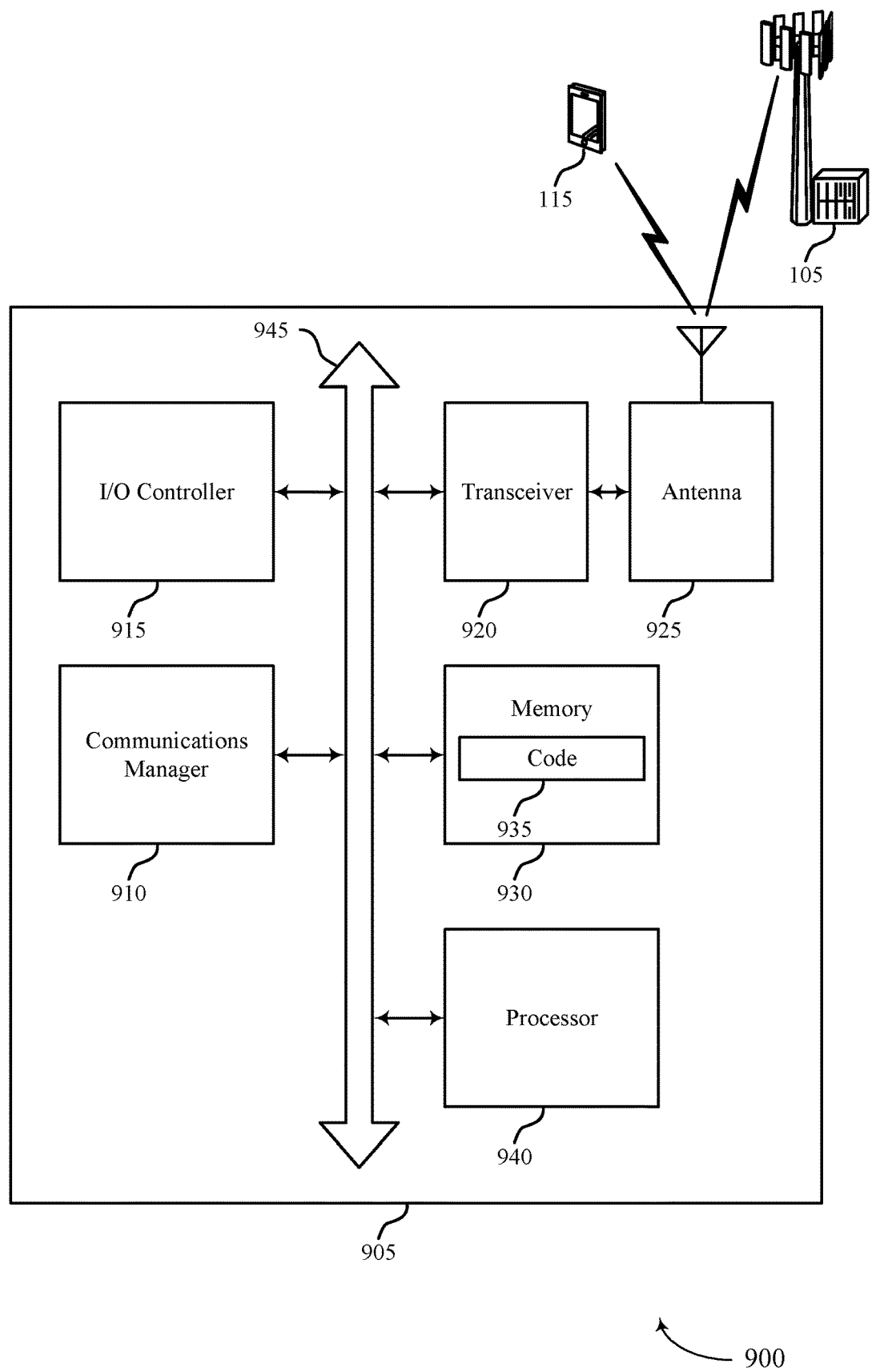
FIG. 9 shows a diagram of a system including a device that supports modem throughput throttling in accordance with aspects of the present disclosure.

FIG. 9 shows a diagram of a system 900 including a device 905 that supports modem throughput throttling in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a throttling indicator and one or more configuration parameters associated with a modem of the UE, the received throttling indicator corresponding to a shared resource of the UE, and communicate with a base station based on a throttling level for the modem, where the throttling level indicates a usage threshold associated with the shared resource based on the received throttling indicator and the received configuration parameters.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting modem throughput throttling).

The processor 940 of the device 905 (e.g., controlling the receiver 610, the transmitter 620), or the transceiver 920) may reduce power consumption and increase resource usage efficiency based on performing modem throttling. In some examples, the processor 940) of the device 905 may reconfigure parameters for processing transmissions received at the modem. For example, the processor 940 of the device 905 may turn on one or more processing units for processing the transmissions, increase a processing clock, or a similar mechanism within the device 905. As such, when subsequent transmissions are received, the processor 940 may be ready to respond more efficiently through the reduction of a ramp up in processing power and by reducing the shared resource usage. The improvements in power saving and transmission processing efficiency may further increase battery life at the device 905 (for example, by reducing or eliminating unnecessary or failed transmissions, etc.).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
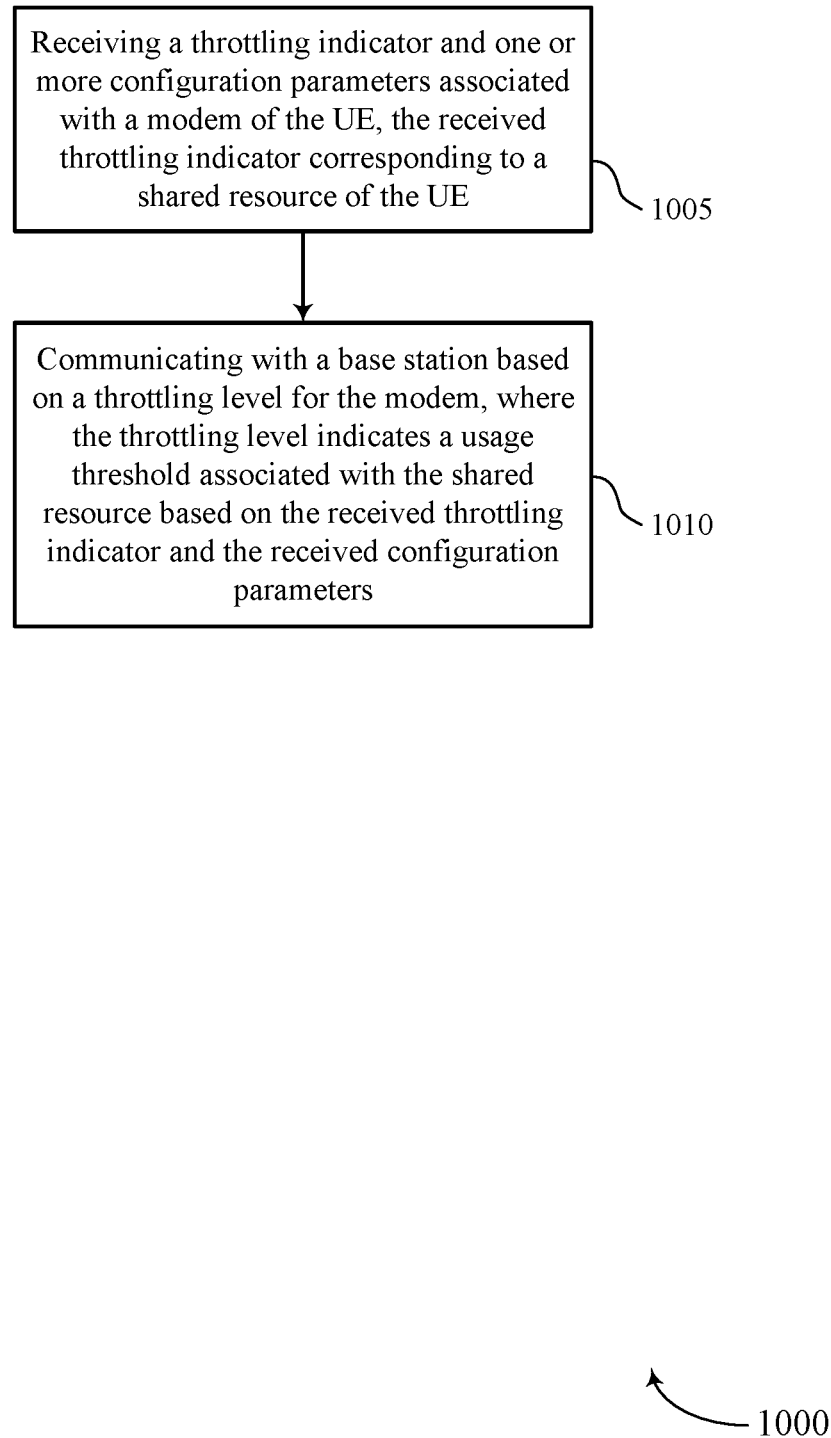
FIGS. 10 through 13 show flowcharts illustrating methods that support modem throughput throttling in accordance with aspects of the present disclosure.

FIG. 10 shows a flowchart illustrating a method 1000 that supports modem throughput throttling in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may receive a throttling indicator and one or more configuration parameters associated with a modem of the UE, the received throttling indicator corresponding to a shared resource of the UE. The operations of 1005 may be performed according to the methods described herein. In some examples, aspects of the operations of 1005 may be performed by one or more components described with reference to FIGS. 6 through 9.

At 1010, the UE may communicate with a base station based on a throttling level for the modem, where the throttling level indicates a usage threshold associated with the shared resource based on the received throttling indicator and the received configuration parameters. The operations of 1010 may be performed according to the methods described herein. In some examples, aspects of the operations of 1010 may be performed by one or more components described with reference to FIGS. 6 through 9.

Figure 11:
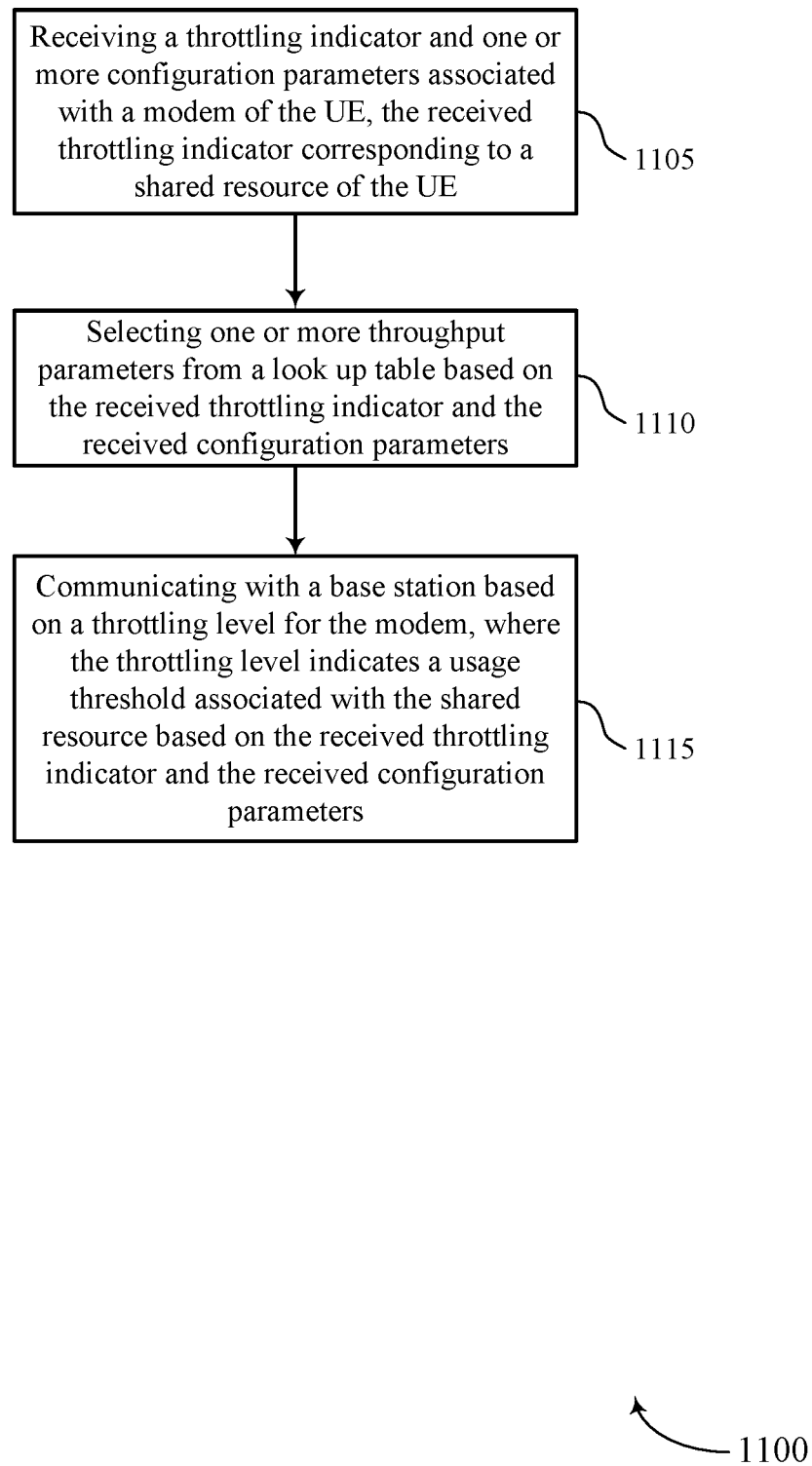

FIG. 11 shows a flowchart illustrating a method 1100 that supports modem throughput throttling in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below: Additionally or alternatively, a UE may perform aspects of the functions described below using special-purpose hardware.

At 1105, the UE may receive a throttling indicator and one or more configuration parameters associated with a modem of the UE, the received throttling indicator corresponding to a shared resource of the UE. The operations of 1105 may be performed according to the methods described herein. In some examples, aspects of the operations of 1105 may be performed by one or more components described with reference to FIGS. 6 through 9.

At 1110, the UE may select one or more throughput parameters from a look up table based on the received throttling indicator and the received configuration parameters. The operations of 1110 may be performed according to the methods described herein. In some examples, aspects of the operations of 1110 may be performed by one or more components described with reference to FIGS. 6 through 9.

At 1115, the UE may communicate with a base station based on a throttling level for the modem, where the throttling level indicates a usage threshold associated with the shared resource based on the received throttling indicator and the received configuration parameters. The operations of 1115 may be performed according to the methods described herein. In some examples, aspects of the operations of 1115 may be performed by one or more components described with reference to FIGS. 6 through 9.

Figure 12:
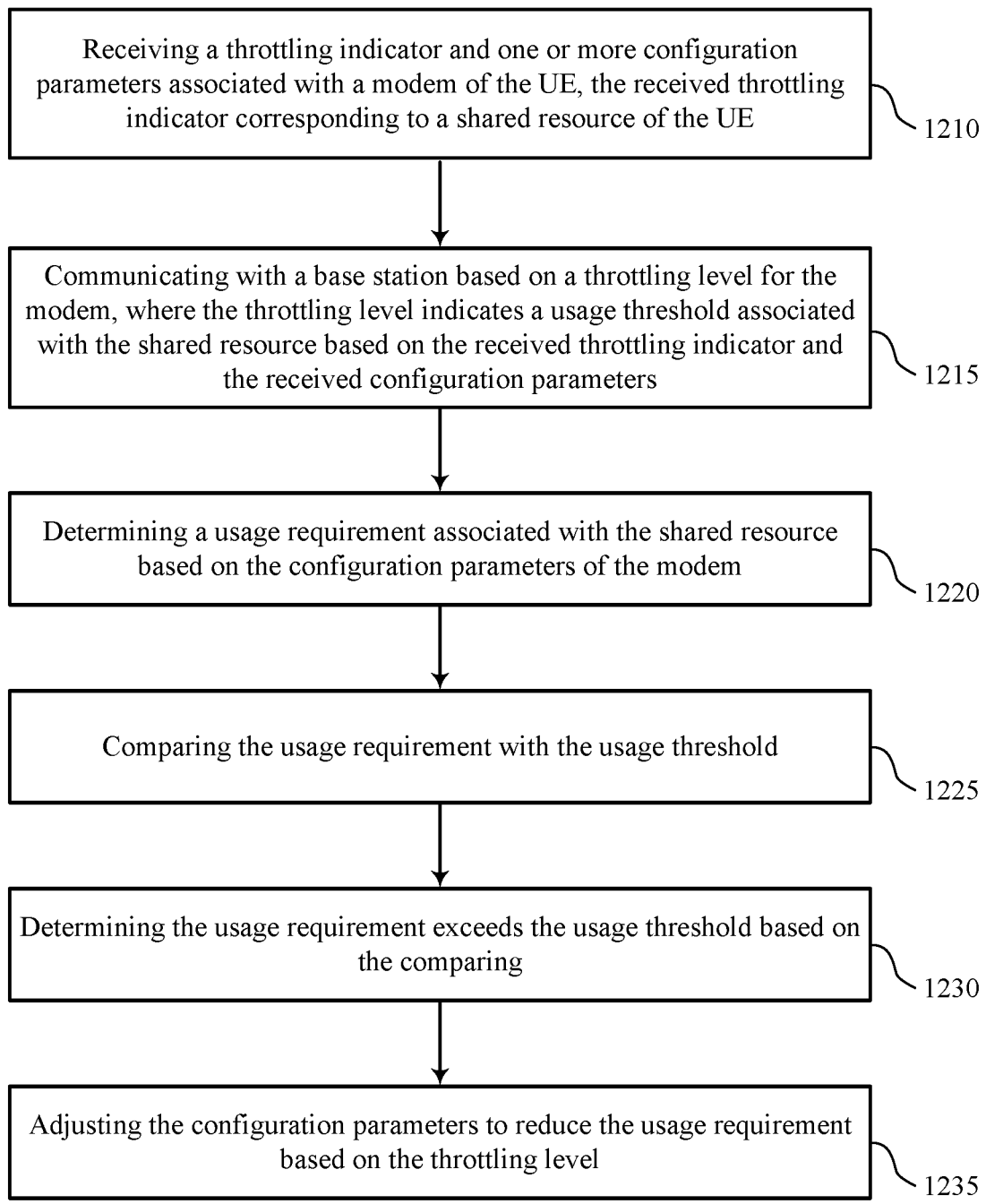

FIG. 12 shows a flowchart illustrating a method 1200 that supports modem throughput throttling in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below: Additionally or alternatively, a UE may perform aspects of the functions described below using special-purpose hardware.

At 1210, the UE may receive a throttling indicator and one or more configuration parameters associated with a modem of the UE, the received throttling indicator corresponding to a shared resource of the UE. The operations of 1210 may be performed according to the methods described herein. In some examples, aspects of the operations of 1210 may be performed by one or more components described with reference to FIGS. 6 through 9.

At 1215, the UE may communicate with a base station based on a throttling level for the modem, where the throttling level indicates a usage threshold associated with the shared resource based on the received throttling indicator and the received configuration parameters. The operations of 1215 may be performed according to the methods described herein. In some examples, aspects of the operations of 1215 may be performed by one or more components described with reference to FIGS. 6 through 9.

At 1220, the UE may determine a usage requirement associated with the shared resource based on the configuration parameters of the modem. The operations of 1220 may be performed according to the methods described herein. In some examples, aspects of the operations of 1220 may be performed by one or more components described with reference to FIGS. 6 through 9.

At 1225, the UE may compare the usage requirement with the usage threshold. The operations of 1225 may be performed according to the methods described herein. In some examples, aspects of the operations of 1225 may be performed by one or more components described with reference to FIGS. 6 through 9.

At 1230, the UE may determine the usage requirement exceeds the usage threshold based on the comparing. The operations of 1230 may be performed according to the methods described herein. In some examples, aspects of the operations of 1230 may be performed by one or more components described with reference to FIGS. 6 through 9.

At 1235, the UE may adjust the configuration parameters to reduce the usage requirement based on the throttling level. The operations of 1235 may be performed according to the methods described herein. In some examples, aspects of the operations of 1235 may be performed by one or more components described with reference to FIGS. 6 through 9.

Figure 13:
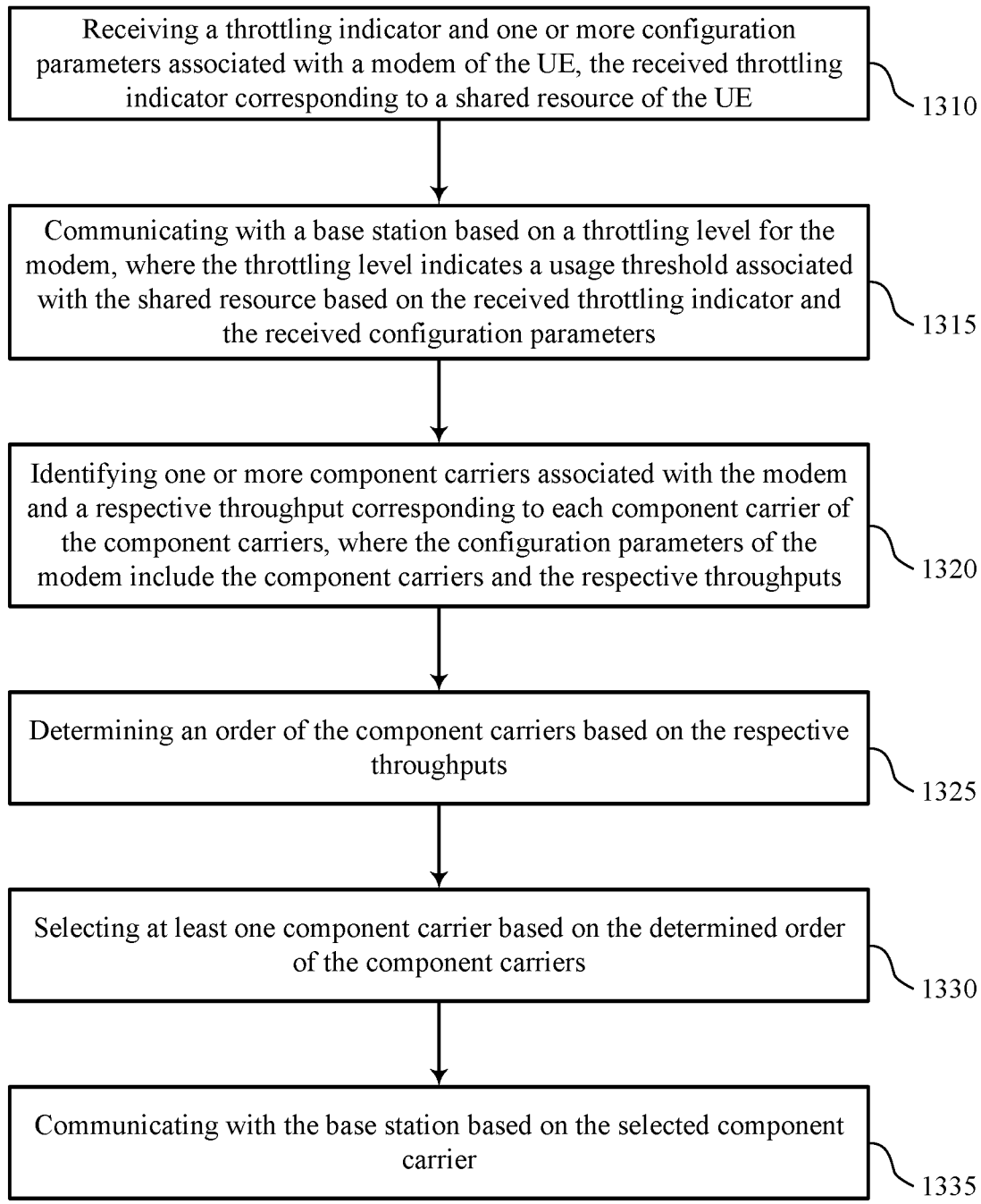

FIG. 13 shows a flowchart illustrating a method 1300 that supports modem throughput throttling in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1310, the UE may receive a throttling indicator and one or more configuration parameters associated with a modem of the UE, the received throttling indicator corresponding to a shared resource of the UE. The operations of 1310 may be performed according to the methods described herein. In some examples, aspects of the operations of 1310 may be performed by one or more components described with reference to FIGS. 6 through 9.

At 1315, the UE may communicate with a base station based on a throttling level for the modem, where the throttling level indicates a usage threshold associated with the shared resource based on the received throttling indicator and the received configuration parameters. The operations of 1315 may be performed according to the methods described herein. In some examples, aspects of the operations of 1315 may be performed by one or more components described with reference to FIGS. 6 through 9.

At 1320, the UE may identify one or more component carriers associated with the modem and a respective throughput corresponding to each component carrier of the component carriers, where the configuration parameters of the modem include the component carriers and the respective throughputs. The operations of 1320 may be performed according to the methods described herein. In some examples, aspects of the operations of 1320 may be performed by one or more components described with reference to FIGS. 6 through 9.

At 1325, the UE may determine an order of the component carriers based on the respective throughputs. The operations of 1325 may be performed according to the methods described herein. In some examples, aspects of the operations of 1325 may be performed by one or more components described with reference to FIGS. 6 through 9.

At 1330, the UE may select at least one component carrier based on the determined order of the component carriers. The operations of 1330 may be performed according to the methods described herein. In some examples, aspects of the operations of 1330 may be performed by one or more components described with reference to FIGS. 6 through 9.

At 1335, the UE may communicate with the base station based on the selected component carrier. The operations of 1335 may be performed according to the methods described herein. In some examples, aspects of the operations of 1335 may be performed by one or more components described with reference to FIGS. 6 through 9.

The following provides an overview of aspects of the present disclosure:

Aspect 1: A method for wireless communications at a UE, comprising: receiving a throttling indicator and one or more configuration parameters associated with a modem of the UE, the received throttling indicator corresponding to a shared resource of the UE; and communicating with a base station based at least in part on a throttling level for the modem, wherein the throttling level indicates a usage threshold associated with the shared resource based at least in part on the received throttling indicator and the received configuration parameters.

Aspect 2: The method of aspect 1, further comprising: determining the usage threshold based at least in part on the received throttling indicator.

Aspect 3: The method of any of aspects 1 through 2, further comprising: adjusting a traffic flow at the modem based at least in part on the throttling level, wherein communicating with the base station is further based at least in part on the adjusted traffic flow.

Aspect 4: The method of aspect 3, wherein adjusting the traffic flow comprises: dropping one or more transmission control protocol packets.

Aspect 5: The method of any of aspects 1 through 4, further comprising: selecting one or more throughput parameters from a look up table based at least in part on the received throttling indicator and the received configuration parameters.

Aspect 6: The method of any of aspects 1 through 5, further comprising: determining a usage requirement associated with the shared resource based at least in part on the configuration parameters of the modem; and comparing the usage requirement with the usage threshold.

Aspect 7: The method of aspect 6, further comprising: determining the usage requirement exceeds the usage threshold based at least in part on the comparing; and adjusting the configuration parameters to reduce the usage requirement based at least in part on the throttling level.

Aspect 8: The method of any of aspects 6 through 7, further comprising: determining the usage threshold exceeds the usage requirement based at least in part on the comparing; and refraining from adjusting the configuration parameters based at least in part on the throttling level.

Aspect 9: The method of any of aspects 1 through 8, further comprising: determining a first resource usage corresponding to a first radio access technology based at least in part on the throttling level.

Aspect 10: The method of aspect 9, further comprising: communicating with the base station using the first radio access technology based at least in part on the determined first resource usage.

Aspect 11: The method of any of aspects 9 through 10, further comprising: determining a second resource usage corresponding to a second radio access technology based at least in part on the throttling level; and communicating with the base station using the first radio access technology or the second radio access technology based at least in part on the determined first resource usage, the determined second resource usage, or a combination thereof.

Aspect 12: The method of any of aspects 9 through 11, further comprising: identifying a first cell group of the first radio access technology, wherein the determined first resource usage corresponds to the first cell group: determining a second resource usage corresponding to a second cell group of the first radio access technology based at least in part on the throttling level; and communicating with the base station using the first cell group or the second cell group of the first radio access technology based at least in part on the determined first resource usage, the determined second resource usage, or a combination thereof.

Aspect 13: The method of any of aspects 1 through 12, wherein communicating with the base station comprises: transmitting a message to the base station comprising a negative acknowledgment (NACK), a channel quality indicator (CQI) report, a rank report, or a combination thereof.

Aspect 14: The method of any of aspects 1 through 13, wherein the configuration parameters of the modem comprise one or more component carriers, one or more layers, a bandwidth, a throughput, or a combination thereof.

Aspect 15: The method of any of aspects 1 through 14, further comprising: determining a change associated with at least one configuration parameter of the configuration parameters: receiving, based at least in part on the change, a second throttling level for the modem; and communicating with the base station based at least in part on the received second throttling level.

Aspect 16: The method of any of aspects 1 through 15, further comprising: identifying one or more component carriers associated with the modem and a respective throughput corresponding to each component carrier of the component carriers, wherein the configuration parameters of the modem comprise the component carriers and the respective throughputs: determining an order of the component carriers based at least in part on the respective throughputs: selecting at least one component carrier based at least in part on the determined order of the component carriers; and communicating with the base station based at least in part on the selected component carrier.

Aspect 17: The method of any of aspects 1 through 16, further comprising: adjusting a mode of operation associated with a component of the UE based at least in part on the throttling level.

Aspect 18: The method of aspect 17, wherein the component comprises an application processor.

Aspect 19: The method of any of aspects 1 through 18, wherein the shared resource comprises a memory bandwidth.

Aspect 20: The method of aspect 19, wherein the received throttling indicator indicates a memory bandwidth cap for the modem.

Aspect 21: The method of any of aspects 19 through 20, wherein the throttling level corresponds to a memory bandwidth back off for the modem.

Aspect 22: The method of any of aspects 19 through 21, wherein the memory bandwidth is associated with double data rate (DDR) synchronous dynamic random-access memory (DRAM).

Aspect 23: The method of any of aspects 1 through 22, wherein the received throttling indicator is based at least in part on a concurrent usage of the shared resource, the concurrent usage associated with a component of the UE.

Aspect 24: The method of aspect 23, wherein the component comprises an application processor, a camera, a wireless local area network device, or a combination thereof.

Aspect 25: An apparatus for wireless communications at a UE, comprising a processor: memory coupled with the processor; and instructions stored in the memory and executable by the processor to cause the apparatus to perform a method of any of aspects 1 through 24.

Aspect 26: An apparatus for wireless communications at a UE, comprising at least one means for performing a method of any of aspects 1 through 24.

Aspect 27: A non-transitory computer-readable medium storing code for wireless communications at a UE, the code comprising instructions executable by a processor to perform a method of any of aspects 1 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a throttling indicator and one or more configuration parameters associated with a modem of the UE, the received throttling indicator corresponding to a shared resource of one or more components of the UE, the shared resource comprising a memory bandwidth; and
   communicating with a network device based at least in part on a throttling level for the modem, the throttling level corresponding to a memory bandwidth back off for the modem, wherein the throttling level indicates a usage threshold associated with the shared resource based at least in part on the received throttling indicator and the received one or more configuration parameters.

2. The method of claim 1, further comprising:
   determining the usage threshold based at least in part on the received throttling indicator.

3. The method of claim 1, further comprising:
   adjusting a traffic flow at the modem based at least in part on the throttling level, wherein communicating with the network device is further based at least in part on the adjusted traffic flow.

4. The method of claim 3, wherein adjusting the traffic flow comprises:
   dropping one or more transmission control protocol packets.
5. The method of claim 1, further comprising:
   selecting one or more throughput parameters from a look up table based at least in part on the received throttling indicator and the received one or more configuration parameters.
6. The method of claim 1, further comprising:
   determining a usage requirement associated with the shared resource of the one or more components of the UE based at least in part on the received one or more configuration parameters of the modem; and
   comparing the usage requirement with the usage threshold.
7. The method of claim 6, further comprising:
   determining the usage requirement exceeds the usage threshold based at least in part on the comparing; and
   adjusting the received one or more configuration parameters to reduce the usage requirement based at least in part on the throttling level.
8. The method of claim 6, further comprising:
   determining the usage threshold exceeds the usage requirement based at least in part on the comparing; and
   refraining from adjusting the received one or more configuration parameters based at least in part on the throttling level.
9. The method of claim 1, further comprising:
   determining a first resource usage corresponding to a first radio access technology based at least in part on the throttling level.
10. The method of claim 9, further comprising:
    communicating with the network device using the first radio access technology based at least in part on the determined first resource usage.
11. The method of claim 9, further comprising:
    determining a second resource usage corresponding to a second radio access technology based at least in part on the throttling level; and
    communicating with the network device using the first radio access technology or the second radio access technology based at least in part on the determined first resource usage, the determined second resource usage, or a combination thereof.
12. The method of claim 9, further comprising:
    identifying a first cell group of the first radio access technology, wherein the determined first resource usage corresponds to the first cell group;
    determining a second resource usage corresponding to a second cell group of the first radio access technology based at least in part on the throttling level; and
    communicating with the network device using the first cell group or the second cell group of the first radio access technology based at least in part on the determined first resource usage, the determined second resource usage, or a combination thereof.
13. The method of claim 1, wherein communicating with the network device comprises:
    transmitting a message to the network device comprising a negative acknowledgment (NACK), a channel quality indicator (CQI) report, a rank report, or a combination thereof.
14. The method of claim 1, wherein the received one or more configuration parameters of the modem comprise one or more component carriers, one or more layers, a bandwidth, a throughput, or a combination thereof.
15. The method of claim 1, further comprising:
    determining a change associated with at least one configuration parameter of the received one or more configuration parameters;
    receiving, based at least in part on the change, a second throttling level for the modem; and
    communicating with the network device based at least in part on the received second throttling level.
16. The method of claim 1, further comprising:
    identifying one or more component carriers associated with the modem and a respective throughput corresponding to each component carrier of the one or more component carriers, wherein the received one or more configuration parameters of the modem comprise the one or more component carriers and the respective throughputs;
    determining an order of the one or more component carriers based at least in part on the respective throughputs;
    selecting at least one component carrier based at least in part on the determined order of the one or more component carriers; and
    communicating with the network device based at least in part on the selected component carrier.
17. The method of claim 1, wherein the received throttling indicator indicates a memory bandwidth cap for the modem.
18. The method of claim 1, wherein the memory bandwidth is associated with double data rate (DDR) synchronous dynamic random-access memory (DRAM).
19. The method of claim 1, wherein the received throttling indicator is based at least in part on a concurrent usage of the shared resource, the concurrent usage associated with the one or more components of the UE.
20. The method of claim 19, wherein the component comprises an application processor, a camera, a wireless local area network device, or a combination thereof.
21. An apparatus for wireless communications at a user equipment (UE), comprising:
    means for receiving a throttling indicator and one or more configuration parameters associated with a modem of the UE, the received throttling indicator corresponding to a shared resource of one or more components of the UE, the shared resource comprising a memory bandwidth; and
    means for communicating with a network device based at least in part on a throttling level for the modem, the throttling level corresponding to a memory bandwidth back off for the modem, wherein the throttling level indicates a usage threshold associated with the shared resource based at least in part on the received throttling indicator and the received one or more configuration parameters.
22. The apparatus of claim 21, further comprising:
    means for determining the usage threshold based at least in part on the received throttling indicator.
23. The apparatus of claim 21, further comprising:
    means for adjusting a traffic flow at the modem based at least in part on the throttling level, wherein communicating with the network device is further based at least in part on the adjusted traffic flow.
24. The apparatus of claim 21, further comprising:
    means for selecting one or more throughput parameters from a look up table based at least in part on the received throttling indicator and the received one or more configuration parameters.

25. The apparatus of claim 21, further comprising:
means for determining a usage requirement associated with the shared resource of the one or more components of the UE based at least in part on the received one or more configuration parameters of the modem; and
means for comparing the usage requirement with the usage threshold.

26. An apparatus for wireless communications at a user equipment (UE), comprising:
one or more processors,
one or more memories coupled with the one or more processors; and
instructions stored in the one or more memories and executable by the one or more processors to cause the apparatus to:
receive a throttling indicator and one or more configuration parameters associated with a modem of the UE, the received throttling indicator corresponding to a shared resource of one or more components of the UE, the shared resource comprising a memory bandwidth; and
communicate with a network device based at least in part on a throttling level for the modem, the throttling level corresponding to a memory bandwidth back off for the modem, wherein the throttling level indicates a usage threshold associated with the shared resource based at least in part on the received throttling indicator and the received one or more configuration parameters.

27. One or more non-transitory computer-readable mediums storing code for wireless communications at a user equipment (UE), the code comprising instructions executable by one or more processors to:
receive a throttling indicator and one or more configuration parameters associated with a modem of the UE, the received throttling indicator corresponding to a shared resource of one or more components of the UE, the shared resource comprising a memory bandwidth; and
communicate with a network device based at least in part on a throttling level for the modem, the throttling level corresponding to a memory bandwidth back off for the modem, wherein the throttling level indicates a usage threshold associated with the shared resource based at least in part on the received throttling indicator and the received one or more configuration parameters.

* * * * *